United States Patent
Chae et al.

(10) Patent No.: US 7,499,728 B2
(45) Date of Patent: Mar. 3, 2009

(54) SYSTEM AND METHOD FOR TRANSMITTING AND RECEIVING A SIGNAL IN A MOBILE COMMUNICATION SYSTEM USING A MULTIPLE INPUT MULTIPLE OUTPUT ADAPTIVE ANTENNA ARRAY SCHEME

(75) Inventors: Chan-Byoung Chae, Seoul (KR); Chang-Ho Suh, Seoul (KR); Byoung-Yun Kim, Suwon-si (KR); Katz Marcos Daniel, Suwon-si (KR); Pan-Yuh Joo, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 518 days.

(21) Appl. No.: 10/899,400

(22) Filed: Jul. 26, 2004

(65) Prior Publication Data

US 2005/0020313 A1 Jan. 27, 2005

(30) Foreign Application Priority Data

Jul. 26, 2003 (KR) ...................... 10-2003-0051833

(51) Int. Cl.
*H04M 1/00* (2006.01)

(52) U.S. Cl. ...................... 455/562.1; 455/561; 455/65; 375/148; 375/340; 375/346

(58) Field of Classification Search ................. 455/101, 455/129, 103, 506, 114.1, 114.2, 562.1, 561, 455/65; 375/148, 340, 346
See application file for complete search history.

(56) References Cited

U.S. PATENT DOCUMENTS

| | | | |
|---|---|---|---|
| 2002/0044615 A1* | 4/2002 | Denno | 375/346 |
| 2002/0061051 A1* | 5/2002 | Kitahara | 375/144 |
| 2003/0035491 A1* | 2/2003 | Walton et al. | 375/267 |
| 2003/0060173 A1* | 3/2003 | Lee et al. | 455/103 |
| 2003/0139194 A1* | 7/2003 | Onggosanusi et al. | 455/506 |
| 2004/0157567 A1* | 8/2004 | Jootar et al. | 455/101 |
| 2004/0170234 A1* | 9/2004 | Pukkila et al. | 375/340 |
| 2005/0032476 A1* | 2/2005 | Chae et al. | 455/65 |
| 2007/0015545 A1* | 1/2007 | Leifer et al. | 455/562.1 |

OTHER PUBLICATIONS

Lu et al., "Adaptive Blind MIMO Channel Estimation and Multiuser Detection in DS-COMA Systems", Global Telecommunications Conference—Globecom '99, pp. 2254-2258.

* cited by examiner

*Primary Examiner*—Vincent P Harper
*Assistant Examiner*—Khai M Nguyen
(74) *Attorney, Agent, or Firm*—The Farrell Law Firm, PC

(57) ABSTRACT

A method for transmitting and receiving weight information for creating transmission/reception beams in a mobile communication system using a multiple input multiple output adaptive antenna array scheme. The method includes a receiver receiving a predetermined signal, and differentially providing weights to a first scheme and a second scheme for minimizing an error between the received signal and a predetermined reference signal, thereby obtaining a minimum error value. The receiver generates a despread signal by despreading the received signal, produces a reception weight for creation of a reception beam by the receiver through calculation using the despread signal and the minimum error value, and produces a transmission weight for creation of a transmission beam by a counterpart transmitter through calculation using the reception weight and the minimum error value. The receiver generates predetermined feedback information including the transmission weight and a transmitter transmits the feedback information to a counterpart receiver.

28 Claims, 11 Drawing Sheets

SYSTEM AND METHOD FOR TRANSMITTING AND RECEIVING A SIGNAL IN A MOBILE COMMUNICATION SYSTEM USING A MULTIPLE INPUT MULTIPLE OUTPUT ADAPTIVE ANTENNA ARRAY SCHEME

PRIORITY

This application claims priority to an application entitled "System and Method for Transmitting/Receiving Signal in Mobile Communication System Using Multiple Input Multiple Output Adaptive Antenna Array Scheme" filed in the Korean Industrial Property Office on Jul. 26, 2003 and assigned Serial No. 2003-51833, the contents of which are hereby incorporated by reference.

BACKGROUND OF THE INVENTION

1. Field of the Invention

The present invention relates generally to a mobile communication system, and more particularly to a system and a method for transmitting and receiving data in a mobile communication system using a multiple input multiple output adaptive antenna array scheme.

2. Description of the Related Art

Packet service communication systems, which are used to transmit burst packet data to a plurality of mobile stations, have been developed as next-generation mobile communication systems and are designed with the capabilities for transmitting mass storage data.

Recently, a number of packet service communication systems are being developed in order to provide a high-speed packet service. The 3GGP ($3^{rd}$ Generation Partnership Project), which is a consortium established for providing asynchronous telecommunication standards, has suggested a high-speed downlink packet access (HSDPA) scheme for providing the high-speed packet service. In addition, the 3GGP2 ($3^{rd}$ Generation Partnership Project2), which is a consortium established for providing synchronous telecommunication standards, has suggested a 1× EV-DO/V (1× Evolution Data Only/Voice) scheme for providing the high-speed packet service.

Both HSDPA and 1× EV-DO/V schemes suggest the high-speed packet service in order to easily transmit Internet services, such as web services. When providing such a high-speed packet service, a peak throughput as well as an average throughput must be optimized in order to easily transmit packet data and circuit data, such as voice services.

More specifically, in order to allow a communication system using the HSDPA scheme (hereinafter, simply referred to as "HSDPA communication system") to transmit the high-speed packet data, three schemes including an adaptive modulation and coding (AMC) scheme, a hybrid automatic retransmission request (HARQ) scheme, and a fast cell select (FCS) scheme are newly provided for the HSDPA communication system.

The HSDPA communication system improves a data transmission rate thereof by using the AMC scheme, the HARQ scheme, and the FCS scheme. Although the HSDPA communication system has been described as an example, a communication system using a 1× EV-DO/V scheme (hereinafter, simply referred to as "1× EV-DO/V communication system") may be provided in order to improve the data transmission rate. In order to improve performance of the 1× EV-DO/V communication system, the data transmission rate thereof must be increased.

Other than the above new schemes, such as the AMC scheme, the HARQ scheme, and the FCS scheme, a multiple antenna scheme can be used in order to increase the data transmission rate while overcoming a limitation of an assigned bandwidth. Such a multiple antenna scheme utilizes a space domain in order to overcome the limitation of bandwidth resource in a frequency domain.

A mobile communication system is constructed such that it communicates with a plurality of mobile stations through a base station. If the base station transmits high-speed data to the mobile stations, a fading phenomenon may occur due to a characteristic of a radio channel. In order to overcome the fading phenomenon, a transmission antenna diversity scheme, which is a multiple antenna scheme, has been suggested. According to the transmission antenna diversity scheme, signals are transmitted through at least two antennas, that is, through a multiple antenna in such a manner that transmission loss of data caused by the fading phenomenon can be minimized, thereby increasing the data transmission rate.

In general, different than a wired channel environment, a radio channel environment in a mobile communication system is subject to various parameters, such as multipath interference, shadowing, wave attenuation, noise, and interference. As a result, a radio channel may receive a signal distorted from an actual transmission signal.

Herein, the fading phenomenon caused by the multipath interference closely relates to a reflective member or a user, that is, relates to mobility of a mobile station and the radio channel may receive a transmission signal mixed with an interference signal due to the fading phenomenon. Therefore, the signal received in the radio channel is distorted from the actual transmission signal so that performance of the mobile communication system is deteriorated. That is, the fading phenomenon may distort amplitude and phase of the signal received in the radio channel, such that the fading phenomenon becomes a main factor interfering high-speed data communication in the radio channel environment.

Various research have been carried out in an attempt to solve the fading phenomenon. In short, in order to transmit high-speed data in the mobile communication system, it is necessary to minimize loss derived from the characteristics of the mobile communication channel, such as the fading phenomenon, and interference of users. In order to prevent unstable communication caused by the fading phenomenon, various diversity schemes have been adopted by the mobile communication system. One of such diversity schemes is a space diversity scheme, which uses a multiple antenna.

In addition, a transmission antenna diversity scheme has been suggested in order to effectively solve the fading phenomenon. According to the transmission antenna diversity scheme, a radio channel receives a plurality of transmission signals, which have experienced the fading phenomenon, in order to deal with the distortion of signals caused by the fading phenomenon. The transmission antenna diversity scheme includes a time diversity scheme, a frequency diversity scheme, a multipath diversity scheme, and a space diversity scheme.

In order to transmit high-speed data, the mobile communication system must solve the fading phenomenon exerting a bad influence on performance of the mobile communication system, because the fading phenomenon may reduce an amplitude of a signal to a few dB to tens of dB. Therefore, the diversity scheme is used in order to solve the above fading phenomenon. For example, a code division multiple access (CDMA) scheme utilizes a rake receiver that is capable of obtaining a diversity function by using a delay spread of a channel. The rake receiver is a reception diversity type receiver capable of receiving a multi-path signal. However, the reception diversity type rake receiver has a disadvantage in that it cannot obtain a required diversity gain if a channel has a relatively small delay spread.

The time diversity scheme can effectively handle a burst error occurring in a radio channel environment by using interleaving and coding schemes. Generally, the time diversity scheme is used in a Doppler spread channel. However, according to the above time diversity scheme, a diversity effect reduces in a low-speed Doppler spread channel.

The space diversity scheme is commonly used in a channel having a relatively small delay spread. For example, the space diversity scheme is used in an indoor channel and a pedestrian channel, which is a low-speed Doppler spread channel. According to the space diversity scheme, at least two antennas are used to obtain a diversity gain. If a signal transmitted through one antenna is attenuated due to a fading phenomenon, a signal transmitted through the other antenna is received in the channel, thereby obtaining the diversity gain. The space diversity scheme is divided into a reception antenna diversity scheme using a plurality of reception antennas, a transmission antenna diversity scheme using a plurality of transmission antennas, and a multiple input multiple output (MIMO) scheme using a plurality of reception antennas and transmission antennas.

According to the MIMO-adaptive antenna array (AAA) scheme, signals are received through an antenna array including a plurality of reception antennas, and predetermined weight vectors are applied to signal vectors of the received signals in such a manner that intensity of desired signals transmitted to a receiver through a proper transmission direction can be maximized and intensity of undesired signals transmitted to the receiver through an improper transmission direction, that is, intensity of undesired signals improperly transmitted to the receiver can be minimized. In addition, the receiver transmits a signal to a transmitter after calculating a transmission weight vector for the signal, such that a beam of a signal transmitted to the receiver from the transmitter can be effectively created. That is, according to the above MIMO-AAA scheme, only a required signal is maximally amplified when the signal is received in the receiver. The signal is radiated toward the receiver with maximum intensity, such that speech quality can be improved and service areas can be enlarged.

Although the above MIMO-AAA scheme is adaptable for various mobile communication systems using a frequency division multiple access (FDMA) scheme, a time division multiple access (TDMA) scheme, or a CDMA, the MIMO-AAA scheme will be described in relation to a mobile communication system using the CDMA scheme (hereinafter, simply referred to as "CDMA mobile communication system") for convenience of explanation.

FIG. 1 is a block diagram illustrating structures of a transmitter and a receiver of a conventional CDMA mobile communication system. However, prior to describing FIG. 1, it is noted that the following description is made on the assumption that the CDMA mobile communication system utilizes an MIMO-AAA scheme. Accordingly, the transmitter and the receiver must have a plurality of transmission antennas and reception antennas, respectively. However, according to FIG. 1, the transmitter and the receiver do not individually have transmission antennas and reception antennas, but the same antennas are used for both transmission and reception through a time division scheme by using a duplexer. In addition, according to FIG. 1, an N-number of antennas is used. Further, the transmitter and the receiver may be a base station or a mobile station.

Referring to FIG. 1, the transmitter includes an encoder 101, an interleaver 103, a transmission beam generator 105, a signal processor 107, a plurality of spreaders including first to $N^{th}$ spreaders 111, 121, . . . , and 131, and an N-number of radio frequency (RF) processors including first to $N^{th}$ RF processors 113, 123, . . . , and 133. In addition, a duplexer 140 and N antennas, including first to $N^{th}$ antennas 141, 143, . . . , and 145, are commonly used for both the transmitter and the receiver.

If data to be transmitted is created, the data is input into the encoder 101. The encoder 101 may encode the data through a predetermined encoding method and output a signal to the interleaver 103. The encoding method includes a turbo encoding method or a convolutional encoding method.

Upon receiving the signal from the encoder 101, the interleaver 103 may interleave the signal through a predetermined interleaving method in order to prevent a burst error and outputs the signal to the transmission beam generator 105. Herein, the signal output from the interleaver 103 is represented as "$z_k$'". Then, the signal processor 107 calculates a weight based on the signal $z_k$' output from the interleaver 103 and outputs the signal to the transmission beam generator 105. The transmission beam generator 105 generates a transmission beam based on the signal $z_k$' output from the interleaver 103 and the weight calculated in the signal processor 107, and outputs the transmission beam to the first to $N^{th}$ spreaders 111, 121, . . . , and 131, respectively. That is, the transmission beam generator 105 receives the signal output from the interleaver 103, creates the transmission beam, and transmits the transmission beam to each of the first to $N^{th}$ spreaders 111, 121, . . . , and 131 in such a manner that the transmission beam can be transmitted to each of the first to $N^{th}$ antennas 141, 143, . . . , and 145. Herein, a procedure of creating the transmission beam does not directly relate to the present invention. Therefore, a detailed description thereof will be omitted.

A set of signals output from the transmission beam generator 105 is represented as "$y_k$'". That is, $y_k$' is a set of signals generated from the transmission beam generator 105 and mapped with a $k^{th}$ antenna.

The first spreader 111 receives a signal $y_1$' output from the transmission beam generator 105 and spreads the signal $y_1$' by using a predetermined spreading code. After that, the first spreader 111 outputs the signal $x_1$ to the first RF processor 113. Upon receiving the signal from the first spreader 111, the first RF processor 113 performs an RF-treatment process with respect to the signal and outputs the signal to the duplexer 140. Each of the RF processors includes an amplifier, a frequency converter, a filter, and an analog to digital converter to process RF signals.

In addition, the second spreader 121 receives a signal $y_2$' output from the transmission beam generator 105 and spreads the signal $y_2$' by using a predetermined spreading code. Thereafter, the second spreader 121 outputs the signal $x_2$ to the second RF processor 123. Upon receiving the signal from the second spreader 111, the second RF processor 123 performs an RF-treatment process with respect to the signal and outputs the signal to the duplexer 140.

In the same manner, the $N^{th}$ spreader 131 receives a signal $y_N$' output from the transmission beam generator 105 and spreads the signal $y_N$' by using a predetermined spreading code. Thereafter, the $N^{th}$ spreader 131 outputs the signal $x_N$ to the $N^{th}$ RF processor 133. Upon receiving the signal from the N$^{th}$ spreader 131, the N$^{th}$ RF processor 133 performs an RF-treatment process with respect to the signal and outputs the signal to the duplexer 140.

The duplexer 140 controls the signal transmission and reception operations by scheduling a transmission point and a receiving point of the signal under the control of a controller (not shown). In addition, the first to N$^{th}$ antennas 141, 143, ..., and 145 can be operated as transmission antennas (Tx. ANT) or reception antennas (Rx. ANT) according to the signal transmission and reception operations of the duplexer 140.

The receiver of the base station of the CDMA mobile communication system includes N RF processors, including first to N$^{th}$ RF processors 151, 161, ..., and 171, N multipath searchers, including first to N$^{th}$ multipath searchers 153, 163, ..., 173 corresponding to the RF processors, L fingers, including first to L$^{th}$ fingers 180-1, 180-2, ..., 180-L for processing signals regarding L multipaths, which are searched by the multipath searchers, a multipath combiner 191 for combining multipath signals output from the L-number of fingers, a de-interleaver 193, and a decoder 195.

Signals transmitted from a plurality of transmitters are received in the N antennas through a multipath fading radio channel. The duplexer 140 outputs the signal received through the first antenna 141 to the first RF processor 151. Upon receiving the signal from the duplexer 140, the first RF processor 151 performs an RF-treatment process with respect to the signal to convert the signal into a baseband digital signal. Then, the first RF processor 151 sends the baseband digital signal to the first multipath searcher 153. Upon receiving the baseband digital signal from the first RF processor 151, the first multipath searcher 153 divides the baseband digital signal into L multipath components and outputs the multipath components to the first to L$^{th}$ fingers 180-1, 180-2, ..., 180-L, respectively. Each of the first to L$^{th}$ fingers 180-1, 180-2, ..., 180-L is mapped with each of the L multipaths in a one to one correspondence in order to process the multipath components. Because the L multipaths must be considered in relation to each signal received through the N-number of reception antennas, the signal process must be carried out with respect to an N×L number of signals. Among the N×L number of signals, signals having the same path are output to the same finger.

The duplexer 140 outputs the signal received through the second antenna 143 to the second RF processor 161. Upon receiving the signal from the duplexer 140, the second RF processor 161 performs an RF-treatment process with respect to the signal to convert the signal into a baseband digital signal. Then, the second RF processor 161 sends the baseband digital signal to the second multipath searcher 163. Upon receiving the baseband digital signal from the second RF processor 161, the second multipath searcher 163 divides the baseband digital signal into L multipath components and outputs the multipath components to the first to L$^{th}$ fingers 180-1, 180-2, ..., 180-L, respectively.

In the same manner, the duplexer 140 outputs the signal received through the N$^{th}$ antenna 145 to the N$^{th}$ RF processor 171. Upon receiving the signal from the duplexer 140, the N$^{th}$ RF processor 171 performs an RF-treatment process with respect to the signal to convert the signal into a baseband digital signal. Then, the N$^{th}$ RF processor 171 sends the baseband digital signal to the N$^{th}$ multipath searcher 173. Upon receiving the baseband digital signal from the N$^{th}$ RF processor 171, the N$^{th}$ multipath searcher 173 divides the baseband digital signal into L multipath components and outputs the multipath components to the first to L$^{th}$ fingers 180-1, 180-2, ..., 180-L, respectively.

According, among signals received through the N antennas, the same multipath signals of the L multipath signals are input into the same finger. For example, first multipath signals of the first to N$^{th}$ antennas 141 to 145 are input into the first finger 180-1 and L$^{th}$ multipath signals of the first to N$^{th}$ antennas 141 to 145 are input into the L$^{th}$ finger 180-L. The first to L$^{th}$ fingers 180-1 to 180-L have the same structure and operational property even though different signals are input/output to/from the first to L$^{th}$ fingers 180-1 to 180-L. Thus, only the structure and operation of the first finger 180-1 will be described below as an example.

The first finger 180-1 includes N despreaders, including first to N$^{th}$ despreaders 181, 182, ..., and 183 corresponding to the N multipath searchers, a signal processor 184 for receiving signals output from the first to N$^{th}$ despreaders 181 to 183 and calculating weights thereof to create a reception beam, and a reception beam generator 185 for creating the reception beam based on the weights calculated by the signal processor 184.

A first multipath signal output from the first multipath searcher 153 is input into the first despreader 181. Upon receiving the first multipath signal, the first despreader 181 despreads the first multipath signal by using a predetermined despreading code and outputs the first multipath signal to the signal processor 184 and the reception beam generator 185. The despreading code is identical to the spreading code used in each transmitter and the despreading process is called a "time processing".

In addition, the first multipath signal output from the second multipath searcher 163 is input into the second despreader 182. Upon receiving the first multipath signal, the second despreader 182 despreads the first multipath signal by using a predetermined despreading code and outputs the first multipath signal to the signal processor 184 and the reception beam generator 185.

In the same manner, a first multipath signal output from the N$^{th}$ multipath searcher 173 is input into the N$^{th}$ despreader 183. Upon receiving the first multipath signal, the N$^{th}$ despreader 183 despreads the first multipath signal by using a predetermined despreading code and outputs the first multipath signal to the signal processor 184 and the reception beam generator 185.

The signal processor 184 receives signals output from the first to N$^{th}$ despreaders 181 to 183 and calculates a set of weights $w_k$ for creating the reception beam. A set of the first multipath signals output from the first to N$^{th}$ multipath searchers 153 to 173 is defined as "$x_k$". That is, "$x_k$" represents a set of the first multipath signals received at a k$^{th}$ point through the first to N$^{th}$ antennas 141 to 145. All of the first multipath signals forming the first multipath signal set "$x_k$" are vector signals. In addition, $w_k$ represents a set of weights to be applied to each of the first multipath signals received at the k$^{th}$ point through the first to N$^{th}$ antennas 141 to 145. All of the weights forming the weight set $w_k$ are vector signals.

In addition, a set of despread signals of the first multipath signals forming the first multipath signal set "$x_k$" is defined as "$y_k$". Herein, "$y_k$" represents a set of despread signals of the first multipath signals received at a k$^{th}$ point through the first to N$^{th}$ antennas 141 to 145. All of the despread signals forming the despread signal set $y_k$ are vector signals. For the purpose of convenience of explanation, the term "set" will be omitted below. It is noted that parameters having under-bar marks represent a set of specific elements.

In addition, because the first to N$^{th}$ despreaders 181 to 183 despread the first multipath signals $x_k$ by using the predetermined despreading code, power of the desired signal received through the proper transmission direction can be amplified by an amount of a process gain as compared with power of an interference signal.

As described above, despread signals $y_k$ of the first multipath signals $x_k$ are input into the signal processor 184. The signal processor 184 calculates weights $w_k$ based on despread signals $y_k$ of the first multipath signals $x_k$ and outputs the weights $w_k$ to the reception beam generator 185. That is, the signal processor 184 calculates N weights $w_k$ applied to the first multipath signals $x_k$ output from the first to $N^{th}$ antennas 141 to 145 by using despread signals $y_k$ of the N first multipath signals $x_k$. The reception beam generator 185 receives the despread signals $y_k$ of the N first multipath signals $x_k$ and the N of weights $w_k$.

In addition, the reception beam generator 185 creates the reception beam by using the N weights $w_k$. Thereafter, the reception beam generator 185 outputs a signal as an output signal $z_k$ of the first finger 180-1 by combining the despread signals $y_k$ of the N first multipath signals $x_k$ with the weights $w_k$ of the reception beams. The output signal $z_k$ of the first finger 180-1 may be represented as shown below in Equation 1.

$$z_k = w_k^H y_k \quad (1)$$

Equation 1 represents a Hermitian operator, i.e., a transpose of a conjugate. In addition, $z_k$, which is a set of output signals $z_k$ output from the N fingers of the receiver is finally input into the multipath combiner 191.

Even though only the operation of the first finger 180-1 has been described above as an example, other fingers may operate in the same manner as the first finger 180-1. Therefore, the multipath combiner 191 receives the signals output from the first to $L^{th}$ fingers, combines the signals with each other through a multipath scheme, and outputs the signals to the de-interleaver 193. The de-interleaver 193 receives the signals output from the multipath combiner 191, de-interleaves the signals through a predetermined de-interleaving method corresponding to the interleaving method used in the transmitter, and outputs the signals to the decoder 195. Upon receiving the signals from the de-interleaver 193, the decoder 195 decodes the signals through a decoding method corresponding to the encoding method used in the transmitter and outputs signals as final reception data.

The signal processor 184 calculates weights $w_k$ according to a predetermined algorithm in order to minimize a mean square error (MSE) of a signal transmitted from a desired transmitter. In addition, the reception beam generator 185 creates a reception beam by using the weights $w_k$ calculated by the signal processor 184. The process for creating the reception beam such that the MSE can be minimized is called a "spatial processing". Of course, the process for creating a transmission beam such that the MSE can be minimized is also called a "spatial processing". Therefore, when the MIMO-AAA scheme is used for the mobile communication system, the time processing and the spatial processing are simultaneously performed, which is called "spatial-temporal processing".

As described above, the signal processor 184 calculates weights $w_k$ capable of maximizing a gain of the MIMO-AAA scheme according to a predetermined algorithm by receiving multipath signals, before the multipath signals have been despread and after the multipath signals have been despread in each finger. In the same manner, the weights $w_k$ capable of maximizing a gain of the MIMO-AAA scheme are calculated in the transmitter according to a predetermined algorithm. The signal processor 184 and the transmission beam generator 105 operate in order to achieve a minimum MSE.

Recently, research has been actively carried out regarding an algorithm for calculating weights in order to minimize the MSE. According to the algorithm for calculating weights for minimizing the MSE, an error is reduced on the basis of a reference signal. If the reference signal does not exist, the algorithm may provide a constant modulus (CM) scheme and a decision-directed (DD) scheme through a blind method.

However, the algorithm for minimizing the MSE according to a reference signal is not adaptable if a channel is subject to a fast fading environment. For example, if a channel is subject to a fast fading environment, such as a fast fading channel, or a higher order modulation environment, such as 16QAM, it is difficult to obtain the MSE having a minimum value required by a system through the algorithm.

Further, even if the minimum MSE can be obtained through the algorithm, the minimum MSE has a relatively large value. If the minimum MSE is determined with a relatively large value, a gain expected when the MIMO-AAA scheme is applied to the mobile communication system may be significantly reduced, such that it is not adaptable for a high-speed data communication system. In addition, because both a transmitter and a receiver must calculate the weights for creating the transmission beam and the reception beam, respectively, a greater load may occur when calculating the weights.

SUMMARY OF THE INVENTION

Accordingly, the present invention has been designed to solve the above and other problems occurring in the prior art. An object of the present invention is to provide a system and a method for transmitting and receiving data using an adaptive antenna array scheme in a mobile communication system.

It is another object of the present invention to provide a system and a method capable of controlling a weight of a transmitter using weight information of a receiver in a mobile communication system using an adaptive antenna array scheme.

It is another object of the present invention to provide a system and a method using weight creation in transmitting and receiving data in a mobile communication system using an adaptive antenna array scheme.

In accordance with a first aspect of the present invention, in order to accomplish the above and other objects, there is provided a method for transmitting and receiving weight information for creating transmission and reception beams in a mobile communication system using a multiple input multiple output adaptive antenna array scheme. The method includes the steps of: receiving a predetermined signal in a receiver, and differentially providing weights to a first scheme and a second scheme for minimizing an error between the received signal and a predetermined reference signal, thereby obtaining a minimum error value; generating a despread signal by despreading the received signal, producing a reception weight for creation of a reception beam by the receiver through calculation using the despread signal and the minimum error value, and producing a transmission weight for creation of a transmission beam by a counterpart transmitter through calculation using the reception weight and the minimum error value; generating predetermined feedback information including the transmission weight; and transmitting the feedback information from a transmitter to a counterpart receiver.

In accordance with a second aspect of the present invention, there is provided a method for transmitting and receiving a signal in a mobile communication system including a first apparatus and a second apparatus using a multiple input multiple output adaptive antenna array scheme. The first apparatus includes a first transmitter and a first receiver. The second apparatus includes a second transmitter and a second receiver. The method includes the steps of: differentially providing weights to a first scheme and a second scheme by the first receiver for minimizing an error between a received signal and a predetermined reference signal, thereby obtaining a minimum error value; generating, by the first receiver, a despread signal by despreading the received signal; producing, by the first receiver, a reception weight for creation of a reception beam by the first apparatus through calculation using the despread signal and the minimum error value; producing, by the first receiver, a transmission weight for creation of a transmission beam by the second apparatus through calculation using the reception weight and the minimum error value; generating, by the first receiver, feedback information including the transmission weight of the second apparatus; and transmitting the feedback information from the first transmitter to the second receiver; receiving the feedback information in the second receiver; obtaining, by the second apparatus, the transmission weight from the feedback information, generating the transmission beam correspondingly to the transmission weight; and transmitting a signal of the transmission beam through the second transmitter to the first apparatus.

In accordance with a third aspect of the present invention, there is provided a system for transmitting and receiving a signal in a mobile communication system using a multiple input multiple output adaptive antenna array scheme. The system includes: a despreader for generating a despread signal by despreading a received signal; a signal processor for obtaining a minimum error value by differentially providing weights to a first scheme and a second scheme for minimizing an error between the received signal and a predetermined reference signal, producing a reception weight for creation of a reception beam by a receiver through calculation using the despread signal and the minimum error value, and producing a transmission weight for creation of a transmission beam by a counterpart transmitter through calculation using the reception weight and the minimum error value; a feedback information generator for generating feedback information including the transmission weight; and a transmitter for transmitting the feedback information to a counterpart receiver.

In accordance with a fourth aspect of the present invention, there is provided a system for transmitting and receiving transmission weight information in a mobile communication system using a multiple input multiple output adaptive antenna array scheme. The system includes: a first apparatus having a first receiver and a first transmitter; and a second apparatus having a second receiver and the second transmitter. The first receiver receives a predetermined signal, obtains a minimum error value by differentially providing weights to a first scheme and a second scheme for minimizing an error between the received signal and a predetermined reference signal, generates a despread signal by despreading the received signal, produces a reception weight for creation of a reception beam by the first receiver through calculation using the despread signal and the minimum error value, produces a transmission weight for creation of a transmission beam by a second transmitter of a second apparatus through calculation using the reception weight and the minimum error value, and generates feedback information including the transmission weight, the first transmitter transmits the feedback information to the second apparatus. The second receiver receives the feedback information, the second apparatus obtains the transmission weight from the feedback information and generates the transmission beam correspondingly to the transmission weight, and the second transmitter transmits a signal of the transmission beam through the second transmitter to the first apparatus.

BRIEF DESCRIPTION OF THE DRAWINGS

The above and other objects, features, and advantages of the present invention will be more apparent from the following detailed description taken in conjunction with the accompanying drawings, in which.

DETAILED DESCRIPTION OF THE PREFERRED EMBODIMENT

Figure 1:
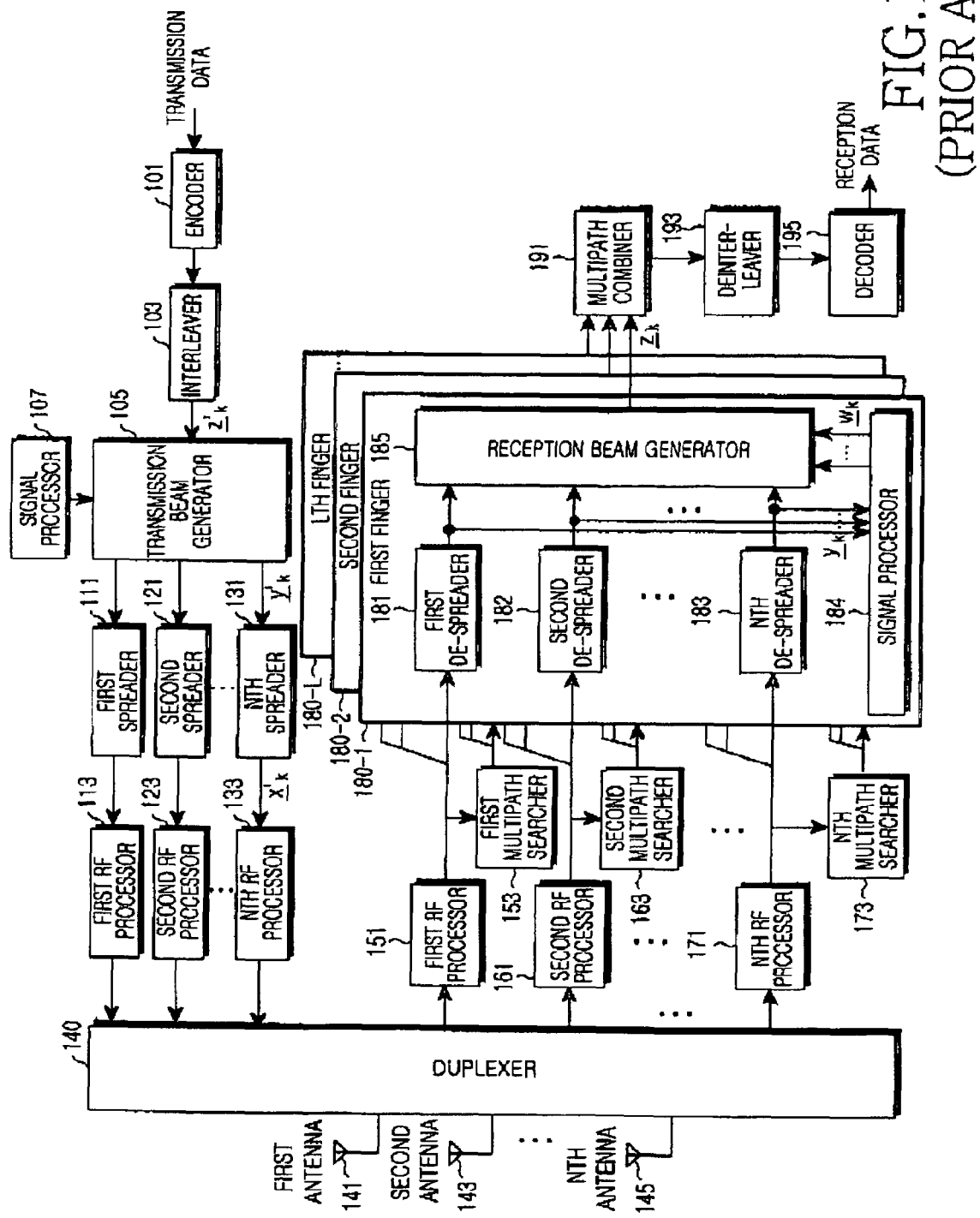
FIG. 1 is a block diagram illustrating a structure of a conventional CDMA mobile communication system.

Hereinafter, preferred embodiments of the present invention will be described in detail with reference to the accompanying drawings. In the following description of the present invention, a detailed description of known functions and configurations incorporated herein will be omitted when it may obscure the subject matter of the present invention.

Prior to describing the present invention, herein below, a description will be made relating to a signal model received in a receiver of a mobile communication system using a CDMA scheme. The receiver may include a base station receiver or a mobile station receiver capable of receiving a signal. Herein, however, the base station receiver will be utilized as an example of the receiver in order to describe a received signal model.

The base station receiver includes a reception antenna array (Rx antenna array) having a plurality of reception antennas. In addition, although the present invention may be adaptable for various mobile communication systems using an FDMA scheme, a TDMA scheme, a CDMA scheme, or an orthogonal frequency division multiplexing OFDM scheme, the present invention will be described in relation to a mobile communication system using the CDMA scheme (hereinafter, simply referred to as "CDMA mobile communication system") and a mobile communication system using the OFDM scheme (hereinafter, simply referred to as "OFDM mobile communication system") for convenience of explanation.

A signal transmitted from a predetermined mobile station that is located in a cell in a service area of a base station, that is, a signal transmitted from a transmitter of an $m^{th}$ mobile station, is represented as shown below in Equation 2.

$$s_m(t) = \sqrt{p_m} b_m(t) c_m(t) \qquad (2)$$

In Equation 2, $s_m(t)$ represents a transmission signal of the $m^{th}$ mobile station, $p_m$ represents transmission power of the $m^{th}$ mobile station, $b_m(t)$ represents a user information bit sequence of the $m^{th}$ mobile station, and $c_m(t)$ represents a user spreading code sequence of the $m^{th}$ mobile station having a chip period of $T_c$.

The transmission signal transmitted from the transmitter of the mobile station is received in the receiver of the base station through a multipath vector channel. Herein, channel parameters of the multipath vector channel are assumed that they may vary with a relatively low speed in relation to a bit period $T_b$. Accordingly, it is assumed that the channel parameters are constantly maintained during predetermined bit periods. Therefore, a complex baseband signal received in the receiver of the base station through a first multipath of the $m^{th}$ mobile station is represented as shown below in Equation 3. It is noted that the received signal represented in Equation 3 is an RF signal, which has been received in the receiver of the base station and down-converted into a baseband signal.

$$x_{ml}(t) = \alpha_{ml} e^{j\phi_{ml}} b_m(t - \tau_{ml}) c_m(t - \tau_{ml}) a_{ml} \qquad (3)$$

In above Equation 3, $x_{ml}(t)$ represents a set of complex baseband signals received in the receiver through the first multipath of the $m^{th}$ mobile station, $\alpha_{ml}$ represents an attenuation degree of fading applied to the first multipath of the $m^{th}$ mobile station, $\phi_{ml}$ represents a phase transition applied to the first multipath of the $m^{th}$ mobile station, $T_{ml}$ represents a time delay applied to the first multipath of the $m^{th}$ mobile station, and $a_{ml}$ represents a set of an array responses (AR) applied to the first multipath of the $m^{th}$ mobile station. Because the receiver of the base station includes N reception antennas, the signal transmitted from the $m^{th}$ mobile station may be received in the receiver through the N reception antennas, such that N signals are received in the receiver through the first multipath of the $m^{th}$ mobile station. Thus, N complex baseband signals received in the receiver through the first multipath of the $m^{th}$ mobile station may form a set of the complex baseband signals. For the purpose of convenience of explanation, the term "set" will be omitted below. As indicated above, it is noted that parameters having under bar marks represent a set of specific elements.

If a currently used linear antenna array is utilized, the array responses $a_{ml}$ may be represented as shown below in Equation 4.

$$\underline{a}_{ml} = \begin{bmatrix} 1 & e^{j2\pi \frac{d}{\lambda} \sin\theta_{ml}} & \cdots & e^{j2\pi \frac{d}{\lambda}(N-1)\sin\theta_{ml}} \end{bmatrix}^T \qquad (4)$$

In Equation 4, d represents an interval between reception antennas, $\lambda$ represents a wavelength in a usable frequency band, N represents the number of reception antennas, and $\theta_{ml}$ represents a direction of arrival (DOA) applied to the first multipath of the $m^{th}$ mobile station.

In addition, on the assumption that the number of mobile stations existing in a cell positioned in a service area of a base station is "M" and L multipaths may exist corresponding to the M mobile stations, the signal received in the base station may include not only signals transmitted from each of the mobile stations, but also additive white noise. The signal can represented in Equation 5.

$$\underline{x}(t) = \sum_{m=1}^{M} \sum_{l=1}^{L} \underline{x}_{ml}(t) + \underline{n}(t) \qquad (5)$$

In above Equation 5, $\underline{n}(t)$ represents a set of additive white noise added to the transmission signals transmitted from the M mobile stations.

Among those reception signals satisfying Equation 5, desired signals required by the base station are defined as $x_{11}$. Herein, $x_{11}$ may represent signals transmitted from a first mobile station through the first multipath. Because the desired signals required by the base station are defined as $x_{11}$, all signals except for $x_{11}$ are regarded as interference signals and noise. Therefore, Equation 5 can be replaced with Equation 6.

$$\underline{x}(t) = \alpha_{11} e^{j\phi_{11}} b_1(t-\tau_{11}) c_1(t-\tau_{11}) a_{11} + i(t) + n(t) \qquad (6)$$

In Equation 6, i(t) represents interference signals. The interference signals can be represented as follows in Equation 7.

$$\underline{i}(t) = \sum_{l=2}^{L} \underline{x}_{1l}(t) + \sum_{m=2}^{M} \sum_{l=1}^{L} \underline{x}_{ml}(t) \qquad (7)$$

In Equation 7 representing interference signals, although a first-half term indicates the desired transmission signals of the mobile station required by the base station, the first-half term represents undesired inter-path interference signals transmitted through multipaths. In addition, a second-half term of Equation 7 represents multiple access interference signals caused by other mobile stations.

In addition, x(t) is despread using a despread code $c_1(t-T_{11})$ which is determined in a finger, that is, in a first finger (l=1) existing in a corresponding multipath of a corresponding channel card of the base station receiver, that is, a channel card (m=1) assigned to the first mobile station. After the despreading for signals x(t) has been performed, signals y(t) are represented. Equation 8 below shows the signals y(t). Herein, the despread code $c_1(t-T_{11})$ is identical to the spread code $c_1(t-T_{11})$ used in the transmitter of the mobile station for transmitting the signal. In addition, the base station has a plurality of receivers having the structure described with reference to FIG. 1. Herein, each of the receivers is called a "channel card" and one channel card is assigned to one mobile station. In addition, as is already described with reference to FIG. 1, the channel card has a plurality of fingers corresponding to the number of multipaths and each finger is mapped with each multipath signal on a one to one basis.

$$\underline{y}(k) = \int_{(k-1)T_b+\tau_{11}}^{kT_b+\tau_{11}} \underline{x}(t)c_1^*(t-\tau_{11})dt \qquad (8)$$

In Equation 8, k represents a $k^{th}$ sampling point.

If signals y(t) are created by despreading signals x(t) using the despread code $c_1(t-T_{11})$, power of desired signals required by the receiver of the base station may be amplified by a process gain G corresponding to the characteristics of the despreader. Herein, it is noted that power of desired signals required by the receiver of the base station can be amplified by a process gain G, but power of undesired signals can be constantly maintained. Accordingly, it is possible to obtain a correlation matrix between reception signals x(t) and despread reception signals y(t). In order to obtain the correlation matrix between reception signals x(t) and despread reception signals y(t), sampling work for the reception signals x(t) is performed at the $k^{th}$ sampling point, at which sample work for despread reception signals y(t) is also performed. Equation 9 shows sampling signals of reception signals x(t) at the $k^{th}$ sampling point.

$$x(k)=a_{11}e^{j\phi_{11}}b_{1k}c_{1k}a_{11}+i_k+n_k \qquad (9)$$

That is, the correlation matrix between reception signals x(t) and despread reception signals y(t) can be achieved on the assumption that the sampling signals as shown in Equation 9 are obtained by sampling reception signals x(t) at the $k^{th}$ sampling point, which is identical to the sampling point of despread reception signals y(t) and reception signals x(t) and reception signals y(t) maintain the stationary state.

Hereinafter, a two-step least mean square (LMS) method will be described.

Complex reception signals received through the N reception antennas at a predetermined point, that is, a set of complex reception signals $x_1$ to $x_N$, which are received through first to $N^{th}$ reception antennas and are not yet despread, is defined as $x=[x_1 x_2 \ldots x_N]^T$. Herein, T is an operator representing a transpose operation. In addition, a set of complex reception signals $x_1$ to $x_N$, which are received through first to $N^{th}$ reception antennas and are despread, is defined as $y=[y_1 y_2 \ldots y_N]^T$. The despread reception signals y may consist of desired signal components s required by the receiver of the base station and undesired signal components u. Equation 10 represents the despread reception signals y.

$$y=s+u \qquad (10)$$

In addition, a set of complex weights applied to complex reception signals $x_1$ to $x_N$ received through the N-number of reception antennas, that is, a set of complex weights $w_1$ to $w_N$, which will be multiplied with complex reception signals $x_1$ to $x_N$ received through the N-number of reception antennas, respectively, is defined as $w=[w_1 w_2 \ldots w_N]^T$.

Thus, output signals z of a channel card of a predetermined user, that is, output signals z, output from fingers in a channel card assigned to a specific mobile station, may be obtained by combining weights w with despread reception signals y. Equation 11 represents the output signals z.

$$z = \underline{w}^H \underline{y} = \sum_{i=1}^{N} w_i^* y_i \qquad (11)$$

In Equation 11, i represents the number of reception antennas.

The output signals z can be divided into desired signal components $w^H s$, which are required by the receiver of the base station and undesired signal components $w^H u$ according to Equations 10 and 11. The LMS method is provided for minimizing an error of a reference signal and a reception signal, that is, the LMS method may minimize a cost function J(w) as shown in Equation 12.

$$J(w)=(e_k)^2$$

$$e_k=d_k-z_k \qquad (12)$$

In Equation 12, J is a cost function. Accordingly, it is necessary to find a value of w capable of minimizing a value of the cost function J. In addition, $e_k$ represents a difference between a received signal and a desired signal, that is, $e_k$ represents an error, and $d_k$ represents the desired signal. According to a beam creation algorithm using a non-blind method, a pilot signal is used as the desired $d_k$. However, the present invention suggests a beam creation algorithm using a blind method, so the beam creation algorithm using the non-blind method will not be further described below.

In Equation 12, the cost function J is provided in the form of a quadratic convex function. Thus, in order to minimize a value of the cost function J, it is necessary to differentiate the cost function J such that a differential value of the cost function J becomes zero. The differential value of the cost function J is represented in Equation 13.

$$\nabla J=-2e^*_k y_k \qquad (13)$$

However, it is difficult to obtain an optimal weigh value $w^{opt}$ at a time under an actual channel environment. Accordingly, because despread reception signals $y_k$ are input in every predetermined period of time, a reflexive equation, such as Equation 14 below, must be used in order to adaptively or reflexively obtain the optimal weigh value $w^{opt}$.

$$w_{R,k+1}=w_{R,k}+\mu v_{R,k} \qquad (14)$$

In Equation 14, k represents a $k^{th}$ point, $w_{R,k}$ represents a weight received at the $k^{th}$ point, μ is a constant gain value, and $v_{R,k}$ represents a trace vector at the $k^{th}$ point. The trace vector $v_{R,k}$ of the $k^{th}$ point allows the cost function J to have a differential value converged into a minimum value, that is, into zero. For convenience of explanation, a weight used for creating a transmission beam of a transmitter is referred to as a "transmission weight" and a weight used for creating a reception beam of a receiver is referred to as "reception weight".

Equation 14 represents an update process for the weight. That is, when the weight $w_{R,k}$ to be used in the present time is given, a weight obtain through a forward transition or a rearward transition of the weight $w_{R,k}$ in a direction of the trace vector $v_{R,k}$ by a constant gain value is updated as a next weight $w_{R,k+1}$ to be used in the next time.

In addition, Equation 14 can be replaced with Equation 15 in view of a mean square.

$$w_{R,k+1}=w_{R,k}-\mu y_k e_k^* \qquad (15)$$

The present invention suggests a weight feed back apparatus and a method thereof for creating a transmission beam by using the MIMO-AAA scheme. In addition, the present invention suggests an apparatus and a method capable of creating weights for the transmission beam and the reception beam through a combination-type weight creation method.

Herein, a transmission weight $w_{T,k}$ is represented as follows in Equation 16.

$$w_{T,k+1} = w_{T,k} - \mu z_k e_k^* w^*_{T,k} \quad (16)$$

As shown in Equation 16, the weight of the transmitter is calculated in the receiver, using a restored signal. Accordingly, the receiver must transmit the calculated weight to the transmitter. That is, the receiver calculates the weight of the transmitter by using a restored signal $z_k$, which can be calculated based on the despread reception signal and reception weight. Thus, according to the preferred embodiment of the present invention, the weight of the transmitter calculated by the receiver is transmitted into the transmitter.

Hereinafter, a procedure of calculating the reception weight will be described with reference to Equations 17 to 28. For convenience of explanation, spread and despread operations will be omitted in the above procedure. In addition, parameters used in Equations 17 to 28 are identical to parameters described with reference to FIG. 1. A signal provided before a beam is generated from the transmitter is defined as "$z_k'$" in FIG. 2. At this time, if a channel is defined as a matrix H, $x_k$ will be represented as follows in Equation 17.

$$z_k = H w_T z_k' + n_k \quad (17)$$

Herein, a signal received by means of a reception beam generator is represented as follows in Equation 18.

$$z_k = w_R^H H w_T z_k' \quad (18)$$

In Equation 18, a term regarding noise is omitted for convenience of calculation. In this case, an error signal occurring in a $k^{th}$ time interval is represented as follows in Equation 19.

$$e_k = d_k - z_k \quad (19)$$
$$= w_{R,k}^H H w_{T,k} z_k$$

Herein, in order to obtain a transmission antenna weight, Equation 19 is differentiated about $w_T$, such that an error differential value is obtained as represented in Equation 20.

$$\frac{d \varepsilon_k^2}{d \underline{w}_{T,k}} = -2 \varepsilon_k \frac{d \varepsilon_k}{d \underline{w}_{T,k}} \quad (20)$$

In Equation 20, an error value $\epsilon_k$ is represented as follows in Equation 21.

$$\varepsilon_k = d_k - \underline{w}_{R,k}^H H \underline{w}_{T,k} z'(k) \quad (21)$$
$$= d_k - \left(z_k'^* H^H \underline{w}_{R,k}\right)^H \underline{w}_{T,k}$$

In addition, a transmission beam creation vector can be represented as follows in Equation 22, by using Equation 21.

$$w_{T,k+1} = w_{T,k} - \mu \epsilon_k z_k' H^T w^*_{R,k} \quad (22)$$

In addition, Equations 23 and 24 can be obtained through rearranging the reception signals of the receiver by multiplying both sides of Equation 22 with $w_T$.

$$x_k w^H_{T,k} = H z_k' w_{T,k} w^H_{T,k} \quad (23)$$

$$H z_k' = \left(x_k \underline{w}_{T,k}^H\right)\left(\underline{w}_{T,k} \underline{w}_{T,k}^H\right)^{-1} \quad (24)$$
$$= \left(x_k \underline{w}_{T,k}^H\right)\left(\underline{w}_{T,k}^H\right)^{-1}\left(\underline{w}_{T,k}\right)^{-1}$$
$$= x_k \underline{w}_{T,k}^H \underline{w}_{T,k} \underline{w}_{T,k}^H$$
$$= x_k \underline{w}_{T,k}^H$$

The term $z_k' H^T w^*_{R,k}$ in Equation 22 can be replaced with Equation 25 by rearranging Equation 24 using Equation 24.

$$z_k' H^T \underline{w}_{R,k}^* = \underline{w}_{T,k}^* x_k^T \underline{w}_{R,k}^* \quad (25)$$
$$= \left(\underline{w}_{R,k}^T x_k \underline{w}_{T,k}^T\right)^T$$
$$= \left(\underline{w}_{R,k}^H x_k \underline{w}_{T,k}^H\right)^T$$
$$= z_k \underline{w}_{T,k}^*$$

Finally, the transmission beam creation vector is represented as shown below in Equation 26.

$$w_{T,k+1} = w_{T,k} - \mu \epsilon_k z_k w^*_{T,k} \quad (26)$$

As described above, an optimum weight $w^{opt}$ is a very important factor for creating the reception beam. The present invention minimizes an error of a reference signal and a reception signal by using the two-step LMS method. That is, according to the present invention, weights $w_{R,k}$ and $w_{T,k}$, which are capable of minimizing the value of the cost function described with reference to Equation 12, are obtained so as to obtain the optical weight $w^{opt}$. That is, the present invention suggests a new method of detecting a desired signal d(k) as shown in Equation 12, and suggests a method for feeding back the transmission weight $w_{T,k}$ to the transmitter after calculating the transmission weight $w_{T,k}$, using the reception weight calculated by the receiver.

According to an embodiment of the present invention, the desired signal d(k) is detected through a blind method. Thus, it is necessary to adaptively converge the reception signal by using a specific estimated value. In order to adaptively converge the reception signal, a combination-mode blind method is employed, which will be described in more detail herein below. Here, the combination-mode blind method refers to a method employing a combination of the CM scheme and the DD scheme in converging a signal.

As indicated above, the CM scheme is defective in that it has a slow converging speed, and the DD scheme is defective in that it is highly probable for the DD scheme to fail to converge a signal in a high order modulation environment or a fast fading environment, such as a fast fading channel. Therefore, according to the present invention, the CM scheme and the DD scheme are combined using a proper function (e.g., sigmoid function), thereby enabling signals to converge into a relatively small MSE value.

In properly combining the CM scheme and the DD scheme, the sigmoid function is employed in a preferred embodiment of the present invention. However, the present invention may employ not only the sigmoid function but also any function or means capable of calculating the error value by applying weights to the two schemes in consideration of the efficiency of the two schemes determining the error value which is a parameter necessary in the weight calculation. In other words, a method capable of calculating an error value by two different schemes (e.g., the CM scheme and the DD scheme)

may employ a proper function, which applies a larger weight to a scheme, which can be more effectively applied during a predetermined period of time.

For example, the CM scheme and the DD scheme show different efficiencies according to the time point of convergence of signals, that is, the CM scheme shows more rapid convergence at an initial stage while the DD scheme can do more exact convergence thereafter. Therefore, it is preferred that the weight is calculated in reflection of the CM scheme more than the DD scheme at an initial stage, and in reflection of the DD scheme more than the CM scheme after the initial stage.

In the combination-mode blind method, an error function can be expressed as the following equation 27 using a sigmoid function.

$$e_k = \alpha_k \cdot e_k^{CM} + \beta_k \cdot e_k^{DD}, \text{ wherein} \quad (27)$$

$$\alpha_k = g(|e_k^{DD}|),$$

$$\beta_k = (1 - g(|e_k^{DD}|))\frac{|e_k^{CM}|}{|e_k^{DD}|}, \text{ and}$$

$$g(x) = \frac{1}{1 + e^{-a(x-0.5)}}, a > 0$$

In equation 27, $e_k^{CM}$, $e_k^{DD}$ represent the error values obtained through calculation using the CM scheme more than the DD scheme. Hereinafter, the error values will be described.

Equation 27 shows that the CM scheme more than the DD scheme are used combination with each other in the entire process where the reception signal is adaptively converged. That is, when $e_k^{DD}$ has a large value, the $g(|e_k^{DD}|)$ become larger and the element of the CM scheme has a more important effect on the entire error value.

In equation 27, g(x) represents an S-shaped function (i.e., sigmoid function), by which the CM scheme has a larger effect on a range where the DD scheme has a smaller effect and the DD scheme has a larger effect on a range where the CM scheme has a smaller effect.

As noted from equation 27, the error value $e_k$ is obtained by applying a weight of $\alpha_k$ to the error value $e_k^{CM}$ of the reception signal obtained through calculation using the CM scheme and applying a weight of $\beta_k$ represents to the error value $e_k^{DD}$ of the reception signal obtained through calculation using the CM scheme and then adding the weighted error values to each other.

Figure 7:
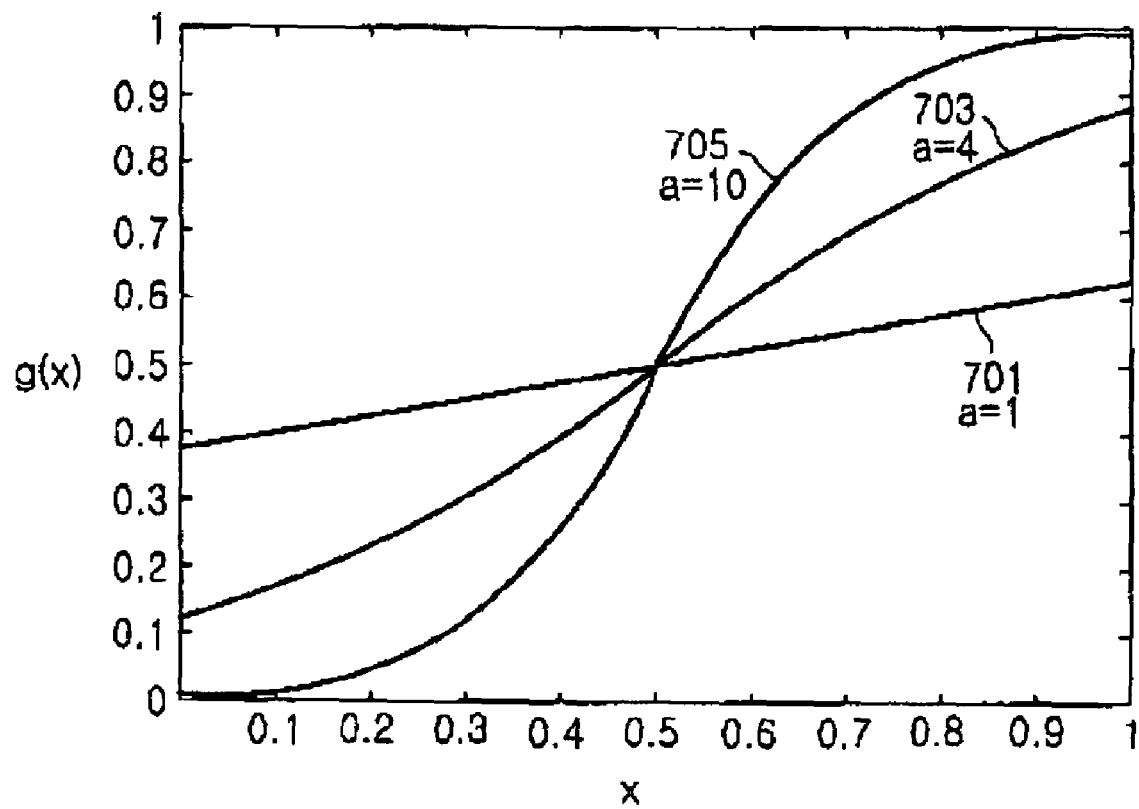
FIG. 7 is a graph illustrating the characteristic of the sigmoid function employed in the present invention.

In equation 27, g(x) is a sigmoid function, the characteristic of which is shown in FIG. 7. Referring to FIG. 7, the characteristic of the S shape depends on the value a. As the value a increases, the shape of the function becomes more similar to an S. As the value a becomes closer to 1, the shape of the function becomes closer to a straight line. Therefore, in equation 17 containing the sigmoid function, $\beta_k$ decreases when $\alpha_k$ increases and $\beta_k$ increases when $\alpha_k$ decreases.

When the error value $e_k^{CM}$ of the reception signal obtained through calculation using the CM scheme exceeds the error value $e_k^{DD}$ of the reception signal obtained through calculation using the CM scheme, the error value $e_k$ is obtained through combination of the weighted CM scheme and the DD scheme having been weighted more than the CM scheme. However, when the error value $e_k^{CM}$ of the reception signal obtained through calculation using the CM scheme does not exceed the error value $e_k^{DD}$ of the reception signal obtained through calculation using the CM scheme, the error value $e_k$ is obtained through combination of the weighted DD scheme and the CM scheme having been weighted more than the DD scheme.

Hereinafter, the CM scheme and the DD scheme will be described in more detail.

The CM scheme is suggested by Godard, and is generally used for a blind equalizer and a beam creation algorithm. If the CM scheme suggested by Godard is used, the cost function J is represented as follows in Equation 28.

$$J_{Godard} = E[(|z_n|^p - R_p)^2] \quad (28)$$

In Equation 28, p is a predetermined positive integer, and $R_p$ is a Godard Modulus. Herein, the Godard modulus $R_p$ is represented as follows in Equation 29.

$$R_p = \frac{E[|z_n|^{2p}]}{E[|z_n|^p]} \quad (29)$$

Recently, discussion has been actively carried out regarding an OFDM mobile communication system. In general, the OFDM mobile communication system uses a relatively higher order modulation more than a quadrature phase shift keying modulation, so the cost function J is divided into a real number section and an imaginary number section when calculating the cost function J as represented in Equation 30 because the transmitting signal and the reception signal have real number components and imaginary number components due to the higher order modulation.

$$J = J_R + J_I \quad (30)$$

$$J_R = E[(z_{n,R}^2 - R_{2,R})^2], J_I = E[(z_{n,I}^2 - R_{2,I})^2]$$

$$R_{2,R} = \frac{E[z_{n,R}^4]}{E[z_{n,R}^2]}, R_{2,I} = \frac{E[z_{n,I}^4]}{E[z_{n,I}^2]}$$

It is assumed that the present invention uses the combination-type LMS method and p is 2. Accordingly, the desired signal d(k) is determined as $d(k)=R_{2,R}+jR_{2,I}$. In addition, at an initial point (herein, k=0), a value of the cost function J is assumed to be zero (J=0).

Figure 8:
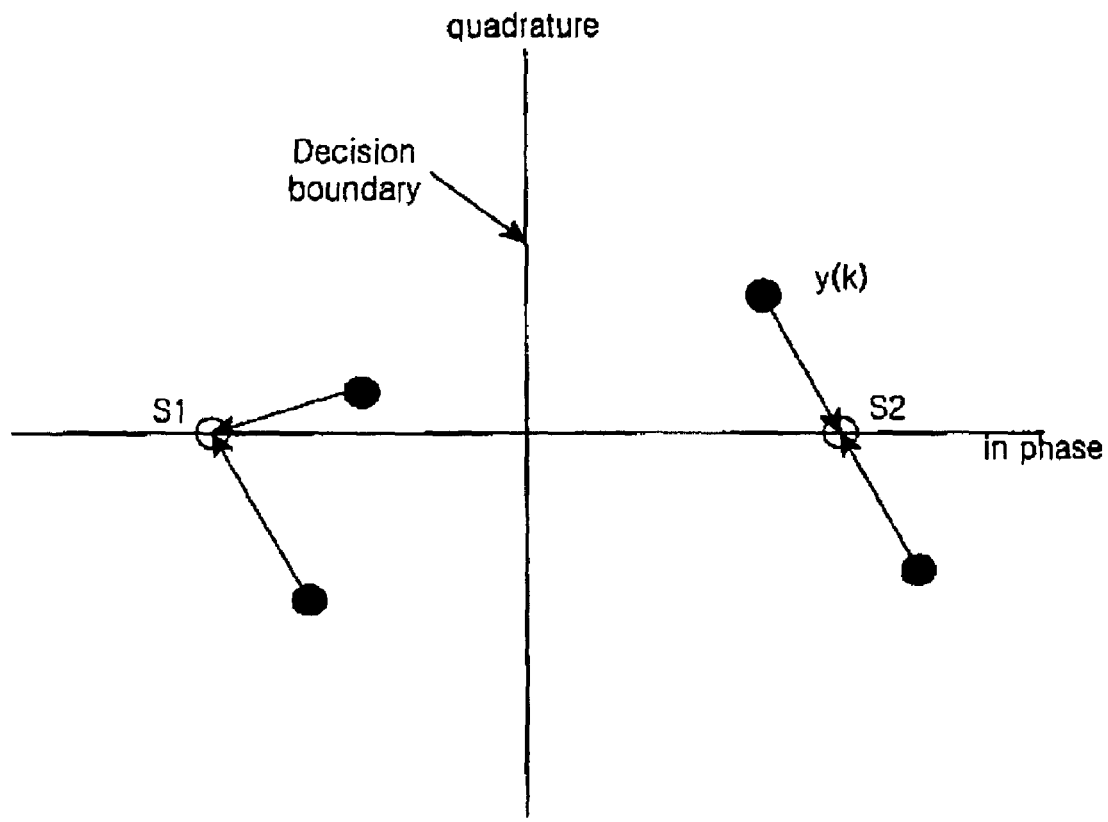
FIG. 8 is a schematic view illustrating a CM scheme used in a mobile communication system, when p=2, $d(k)=R_{2,R}+jR_{2,I}$, and J=0 (herein, k=0)

FIG. 8 is a schematic view illustrating the CM scheme used in a mobile communication system when p=2, $d(k)=R_{2,R}+jR_{2,I}$, and J=0 (herein, k=0). As described above, FIG. 8 shows the CM scheme used when the value of the cost function J becomes 0 at a point in which k=0, p=2, and $d(k)=R_{2,R}+jR_{2,I}$. That is, when the value of $R_2$ is determined according to Equation 30, a circle is formed on a coordinate surface. Thus, when drawing an extension line from a center point of the circle, the extension line meets the circumferential line of the circle. A received signal may be determined based on a point at which the extension line meets the circumferential line of the circle. As illustrated in FIG. 8, the signal $z_k$ restored in the receiver is projected into the circle.

$$d_R(k)=Pr[Re(z(k))]$$

$$d_I(k)=Pr[Im(z(k))] \quad (31)$$

In the same manner as in the CM scheme, the real number section and the imaginary number section must be separately calculated in the DD scheme. In Equation 31, Pr signifies that the signal is transmitted substantially identical to the desired signal d(k) through the DD scheme. According to the DD scheme, the desired signal d(k) is projected with an approximate coordinate value in relation to a coordinate value of the received signal.

Figure 9:
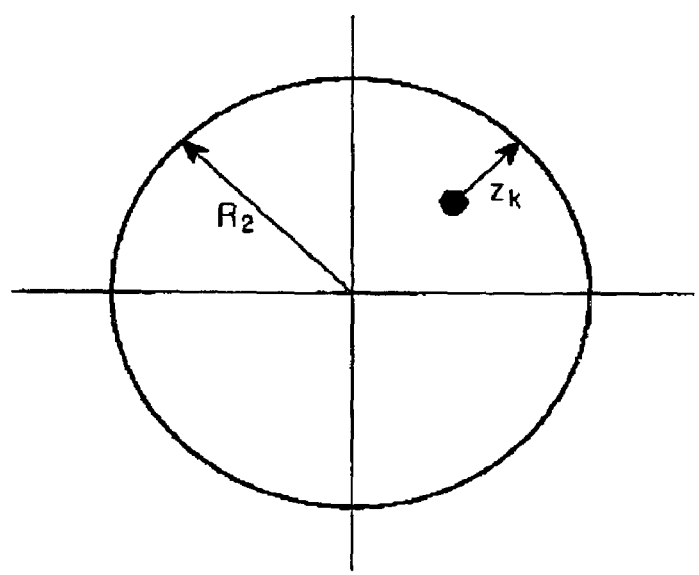
FIG. 9 is a schematic view illustrating a DD scheme when a BPSK scheme is used in a mobile communication system.

FIG. 9 is a schematic view illustrating the DD scheme when a BPSK scheme is used in the mobile communication system. Referring to FIG. 9, because the mobile communication system uses the BPSK (binary phase shift keying) scheme, if the received signal has a coordinate value of (1.2, −0.2) on an I-Q domain, the desired signal d(k) is projected with an approximate coordinate value of 1 after measuring a distance in relation to +1 and −1.

As described above, the present invention enables a reception signal to be converted to a original signal very quickly and exactly by combining the CM scheme and the DD scheme, after applying a sigmoid function to them. Further, according to the present invention, an error value with a minimum cost function is obtained by a method employing the combination of the two schemes, and not only a reception weight but also a transmission weight are determined by means of the error value.

Hereinafter, adaptive antenna array system and method using the reception weight and the transmission weight determined by the combination-type weight creation method will be described in detail with reference to FIGS. 2 through 6.

Figure 2:
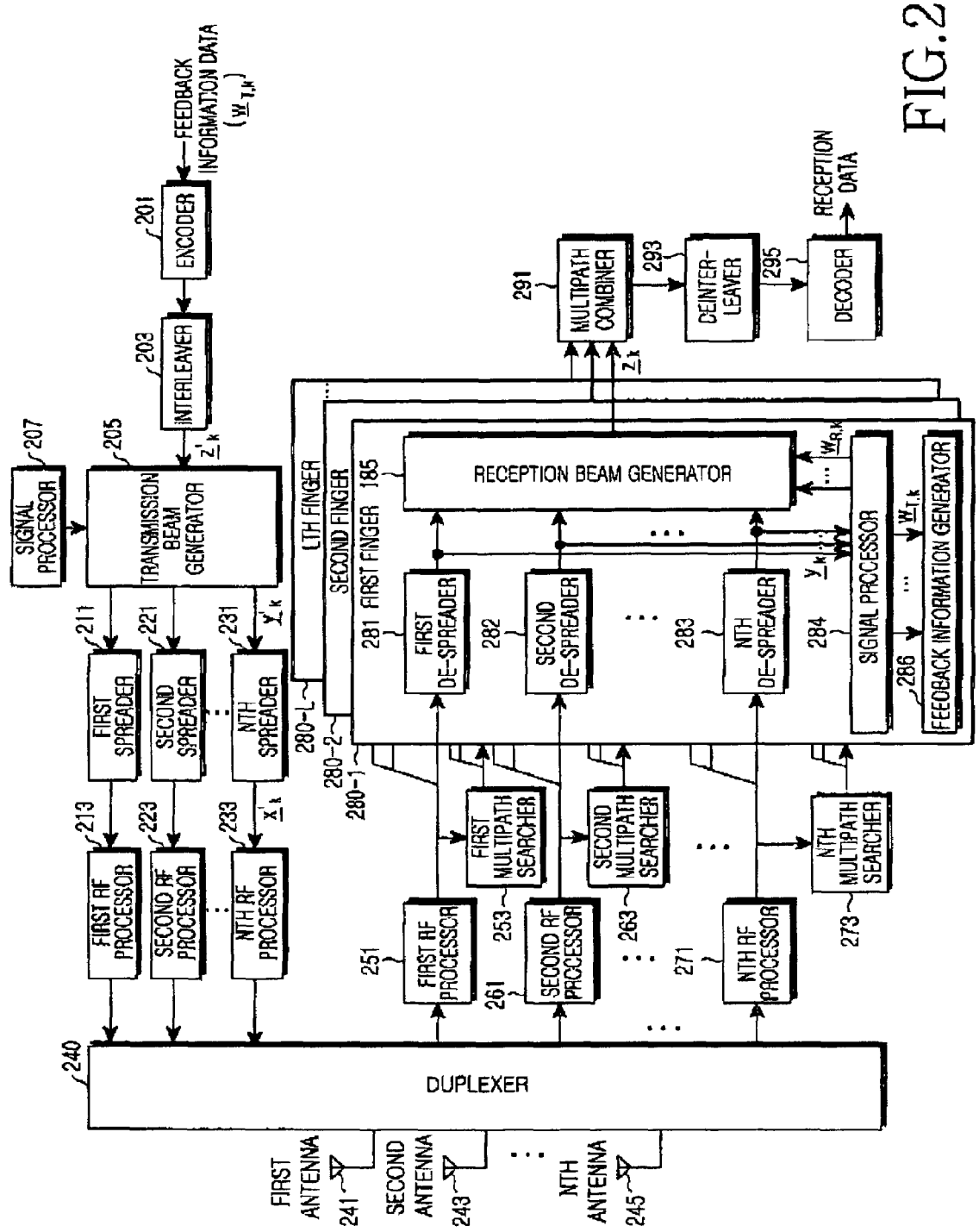
FIG. 2 is a block diagram illustrating structures of a transmitter and a receiver of a base station in a CDMA mobile communication system performing functions according to an embodiment of the present invention.

FIG. 2 is a block diagram illustrating structures of the transmitter and the receiver of the base station of the CDMA mobile communication system performing functions according to one embodiment of the present invention. Structures of the transmitter and the receiver of the base station performing functions shown in FIG. 2 according to one embodiment of the present invention are identical to structures of the transmitter and the receiver of the base station shown in FIG. 1, except for a feedback information generator 286, which is newly added to the present invention, a weight determining procedure of a signal processor 284, and a feedback operation for transmitting the weight determined by the signal processor 284 to the transmitter of the mobile station corresponding to the receiver of the base station.

However, prior to describing FIG. 2 in more detail, it is noted that the following description is made on the assumption that the CDMA mobile communication system adopts the MIMO-AAA scheme. Accordingly, the transmitter and the receiver must have a plurality of transmission antennas and reception antennas, respectively. However, according to FIG. 2, the transmitter and the receiver do not individually have transmission antennas and reception antennas, but the same antennas are used for both transmitter and receiver through a time division scheme by using a duplexer. In addition, according to FIG. 2, N antennas are used.

Referring to FIG. 2, the transmitter of the base station includes an encoder 201, an interleaver 203, a transmission beam generator 205, a signal processor 207, a plurality of spreaders, including first to $N^{th}$ spreaders 211, 221, . . . , and 231, and N RF processors, including first to $N^{th}$ RF processors 213, 223, . . . , and 233. A duplexer 240 and N antennas, including first to $N^{th}$ antennas 241, 243, . . . , and 245, are commonly used for both transmitter and receiver.

If data to be transmitted is created, the data is input into the encoder 201. The encoder 201 may encode the data through a predetermined encoding method and output a signal to the interleaver 203. Herein, the data to be transmitted is feedback information data including the transmission weight $w_{T,k}$ created from the signal processor 284 of the receiver of the base station. Because the transmission weight $w_{T,k}$ is described in more detail later, a detailed description thereof will be omitted for now.

In addition, the encoding method includes a turbo encoding method or a convolutional encoding method. Upon receiving the signal from the encoder 201, the interleaver 203 may interleave the signal through a predetermined interleaving method in order to prevent a burst error and outputs the signal to the transmission beam generator 205. The signal output from the interleaver 203 is defined as "$z_k'$". The signal processor 207 calculates a weight based on the signal $z_k'$ output from the interleaver 203 and outputs the signal to the transmission beam generator 205.

The transmission beam generator 205 generates a transmission beam based on the signal $z_k'$ output from the interleaver 203 and the weight calculated in the signal processor 207 and outputs the transmission beam to the first to $N^{th}$ spreaders 211, 221, . . . , and 231, respectively. Further, the transmission beam generator 205 generates the transmission beam by separately calculating the weights for generating the transmission beam.

As indicated above, a procedure of creating the transmission beam does not directly relate to the present invention. Therefore, a detailed description thereof will be omitted herein.

If the receiver of the base station has previously received the feedback information data from the transmitter of the mobile station, the transmission beam generator 205 may create the transmission beam by using the transmission weight $w_{T,k}$ contained in the feedback information data. A process of creating the transmission beam by receiving the transmission weight $w_{T,k}$ will be described later with reference to FIG. 3.

A set of signals output from the transmission beam generator 205 is represented as "$y_k'$". That is, $y_k'$ is a set of signals generated from the transmission beam generator 205 and mapped with a $k^{th}$ antenna.

The first spreader 211 receives a signal $y_1'$ output from the transmission beam generator 205 and spreads the signal $y_1'$ using a predetermined spreading code. Thereafter, the first spreader 211 outputs the signal $x_1$ to the first RF processor 213. Upon receiving the signal from the first spreader 211, the first RF processor 213 performs an RF-treatment process with respect to the signal and outputs the signal to the duplexer 240. Herein, each of the RF processors includes an amplifier, a frequency converter, a filter, and an analog to digital converter so as to process RF signals.

In addition, the second spreader 221 receives a signal $y_2'$ output from the transmission beam generator 205 and spreads the signal $y_2'$ by using a predetermined spreading code. Thereafter, the second spreader 221 outputs the signal $x_2$ to the second RF processor 223. Upon receiving the signal from the second spreader 211, the second RF processor 223 performs an RF-treatment process with respect to the signal and outputs the signal to the duplexer 240.

In the same manner, the $N^{th}$ spreader 231 receives a signal $y_N'$ output from the transmission beam generator 205 and spreads the signal $y_N'$ by using a predetermined spreading code. Thereafter, the $N^{th}$ spreader 231 outputs the signal $x_N$ to the $N^{th}$ RF processor 233. Upon receiving the signal from the $N^{th}$ spreader 231, the $N^{th}$ RF processor 233 performs an RF-treatment process with respect to the signal and outputs the signal to the duplexer 240.

The duplexer 240 controls the signal transmission and reception operations by scheduling a transmission point and a receiving point of the signal under the control of a controller (not shown). In addition, the first to $N^{th}$ antennas 241, 243, . . . , and 245 can be operated as transmission antennas (Tx. ANT) or reception antennas (Rx. ANT) according to the signal transmission and reception operations of the duplexer 240.

The receiver includes N RF processors, including first to $N^{th}$ RF processors 251, 261, . . . , and 271, N multipath searchers, including first to $N^{th}$ multipath searchers 253, 263, . . . , 273, corresponding to the RF processors, L fingers, including first to $L^{th}$ fingers 280-1, 280-2, . . . , 280-L, for processing signals regarding an L-number of multipaths, which are searched by the multipath searchers, a multipath combiner 291 for combining multipath signals output from the L fingers, a de-interleaver 293, and a decoder 295.

Signals transmitted from a plurality of transmitters are received in the N antennas through a multipath fading radio channel. The duplexer 240 outputs the signal received through the first antenna 241 to the first RF processor 251. Upon receiving the signal from the duplexer 240, the first RF processor 251 performs an RF-treatment process with respect to the signal to convert the signal into a baseband digital signal. The first RF processor 251 sends the baseband digital signal to the first multipath searcher 253. Upon receiving the baseband digital signal from the first RF processor 251, the first multipath searcher 253 divides the baseband digital signal into L multipath components and outputs the multipath components to the first to $L^{th}$ fingers 280-1, 280-2, . . . , 280-L, respectively. Herein, each of the first to $L^{th}$ fingers 280-1, 280-2, . . . , 280-L is mapped with each of the L multipaths in a one to one correspondence in order to process the multipath components. Because the L multipaths must be considered in relation to each signal received through the N reception antennas, the signal process must be carried out with respect to an N×L number of signals. Among the N×L number of signals, signals having the same path are output to the same finger.

In addition, the duplexer 240 outputs the signal received through the second antenna 243 to the second RF processor 261. Upon receiving the signal from the duplexer 240, the second RF processor 261 performs an RF-treatment process with respect to the signal so as to convert the signal into a baseband digital signal. The second RF processor 261 sends the baseband digital signal to the second multipath searcher 263. Upon receiving the baseband digital signal from the second RF processor 261, the second multipath searcher 263 divides the baseband digital signal into L multipath components and outputs the multipath components to the first to $L^{th}$ fingers 280-1, 280-2, . . . , 280-L, respectively.

In the same manner, the duplexer 240 outputs the signal received through the $N^{th}$ antenna 245 to the $N^{th}$ RF processor 271. Upon receiving the signal from the duplexer 240, the $N^{th}$ RF processor 271 processes RF of the signal so as to convert the signal into a baseband digital signal. The $N^{th}$ RF processor 271 sends the baseband digital signal to the $N^{th}$ multipath searcher 273. Upon receiving the baseband digital signal from the $N^{th}$ RF processor 271, the $N^{th}$ multipath searcher 273 divides the baseband digital signal into L multipath components and outputs the multipath components to the first to $L^{th}$ fingers 280-1, 280-2, . . . , 280-L, respectively.

Accordingly, among signals received through the N antennas, the same multipath signals of the L multipath signals are input into the same finger. For example, first multipath signals of the first to $N^{th}$ antennas 241 to 245 are input into the first finger 280-1, and $L^{th}$ multipath signals of the first to $N^{th}$ antennas 241 to 245 are input into the $L^{th}$ finger 280-L. The first to $L^{th}$ fingers 280-1 to 280-L have the same structure and operation with each other even though different signals are input/output to/from the first to $L^{th}$ fingers 280-1 to 280-L. Therefore, only the structure and operation of the first finger 280-1 will be described below as an example.

The first finger 280-1 includes N despreaders, including first to $N^{th}$ despreaders 281, 282, . . . , and 283, which correspond to the N multipath searchers, the signal processor 284 for receiving signals output from the first to $N^{th}$ despreaders 281 to 283 in order to calculate the reception weights $w_{R,k}$ for creating the reception beam and the transmission weights $w_{T,k}$ of the transmitter of the mobile station corresponding to the receiver of the base station, a reception beam generator 285 for creating the reception beam based on the reception weights $w_{R,k}$ calculated by the signal processor 284, and a feedback information generator 286 for creating feedback information including the transmission weights $w_{T,k}$ calculated by the signal processor 284.

The first multipath signal output from the first multipath searcher 253 is input into the first despreader 281. Upon receiving the first multipath signal, the first despreader 281 despreads the first multipath signal by using a predetermined despreading code and outputs the first multipath signal to the signal processor 284 and the reception beam generator 285. In addition, the first multipath signal output from the second multipath searcher 263 is input into the second despreader 282. Upon receiving the first multipath signal, the second despreader 282 despreads the first multipath signal by using a predetermined despreading code and outputs the first multipath signal to the signal processor 284 and the reception beam generator 285. Similarly, the first multipath signal output from the $N^{th}$ multipath searcher 273 is input into the $N^{th}$ despreader 283. Upon receiving the first multipath signal, the $N^{th}$ despreader 283 despreads the first multipath signal by using a predetermined despreading code and outputs the first multipath signal to the signal processor 284 and the reception beam generator 285.

The signal processor 284 receives signals output from the first to $N^{th}$ despreaders 281 to 283 and calculates reception weights $w_{R,k}$ for creating the reception beam. Herein, a set of the first multipath signals output from the first to $N^{th}$ multipath searchers 253 to 273 is defined as "$x_k$". That is, $x_k$ represents a set of the first multipath signals received at a $k^{th}$ point through the first to $N^{th}$ antennas 241 to 245. All of the first multipath signals forming the first multipath signal set $x_k$ are vector signals. In addition, $w_{R,k}$ represents a set of the reception weights to be applied to each of the first multipath signals received at the $k^{th}$ point through the first to $N^{th}$ antennas 241 to 245. All of the weights forming the reception weight set $w_{R,k}$ are vector signals.

In addition, a set of despread signals of the first multipath signals forming the first multipath signal set $x_k$ is defined as "$y_k$". Herein, $y_k$ represents a set of despread signals of the first multipath signals received at a $k^{th}$ point through the first to $N^{th}$ antennas 241 to 245. All of the despread signals forming the despread signal set $y_k$ are vector signals. For the purpose of convenience of explanation, the term "set" will be omitted below. It is noted that parameters having under bar marks represent a set of specific elements.

In addition, since the first to $N^{th}$ despreaders 281 to 283 despread the first multipath signals $x_k$ by using the predetermined despreading code, power of the desired signal can be amplified by an amount of a process gain as compared with power of an interference signal.

As described above, despread signals $y_k$ of the first multipath signals $x_k$ are input into the signal processor 284. The signal processor 284 calculates reception weights $w_{R,k}$ based on despread signals $y_k$ of the first multipath signals $x_k$ and outputs the reception weights $w_{R,k}$ to the reception beam generator 285. That is, the signal processor 284 calculates N reception weights $w_{R,k}$ applied to the first multipath signals $x_k$ output from the first to $N^{th}$ antennas 241 to 245 by using despread signals $y_k$ of the N first multipath signals $x_k$. The reception beam generator 285 receives the despread signals $y_k$ of the N first multipath signals $x_k$ and the N reception weights $w_{R,k}$. In addition, the reception beam generator 285 creates the reception beam by using the N reception weights $w_{R,k}$. Thereafter, the reception beam generator 285 outputs a signal as an output signal $z_k$ of the first finger 280-1 by combining the despread signals $y_k$ of the N first multipath signals $x_k$ with the reception weights $w_{R,k}$ of the reception beams.

In addition, $z_k$ which is a set of output signals $z_k$ output from the N fingers of the base station receiver is finally input into the multipath combiner 291. The signal processor 284 calculates the transmission weights $w_{T,k}$ by using the reception weights $w_{R,k}$, and then, outputs the transmission weights $w_{T,k}$ to the feedback information generator 286. As a result, the feedback information generator 286 creates feedback information including the transmission weights $w_{T,k}$. Herein, the transmitter of the base station transmits the feedback information created from the feedback information generator 286. For example, such feedback information can be transmitted through a dedicated physical channel (DPCH).

Even though only the operation of the first finger 280-1 has been described above as an example, other fingers may operate in the same manner as the first finger 280-1. Therefore, the multipath combiner 291 receives the signals output from the first to $L^{th}$ fingers, combines the signals with each other through a multipath scheme, and outputs the signals to the de-interleaver 293. The de-interleaver 293 receives the signals output from the multipath combiner 291, de-interleaves the signals through a predetermined de-interleaving method corresponding to the interleaving method used in the transmitter, and outputs the signals to the decoder 295. Upon receiving the signals from the de-interleaver 293, the decoder 295 decodes the signals through a decoding method corresponding to the encoding method used in the transmitter and outputs signals as final reception data.

FIG. 2 illustrates a case in which the receiver of the base station calculates the transmission weights $w_{T,k}$ and transmits the transmission weights $w_{T,k}$ to the transmitter of the base station. However, the receiver and the transmitter of the base station can be used as the receiver and the transmitter of the mobile station. That is, it is noted that the above description has been made in view of creation and transmission of feedback information with reference to FIG. 2. Hereinafter, structures of a transmitter and a receiver of a mobile station of a CDMA mobile communication system performing functions according to one embodiment of the present invention will be described with reference to FIG. 3.

Figure 3:
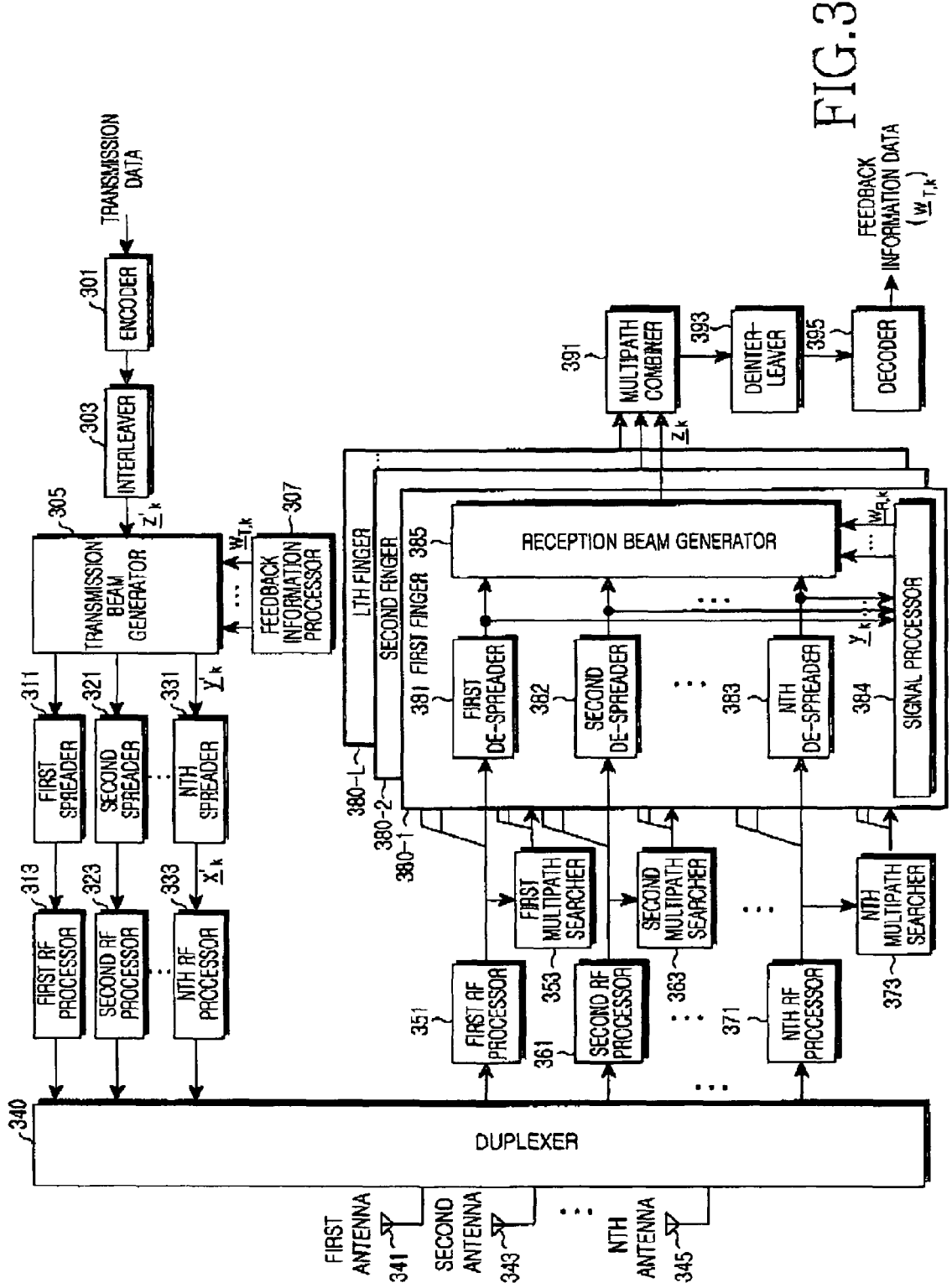
FIG. 3 is a block diagram illustrating structures of a transmitter and a receiver of a mobile station of a mobile communication system performing functions according to an embodiment of the present invention.

FIG. 3 is a block diagram illustrating structures of the transmitter and the receiver of the mobile station of the CDMA mobile communication system performing functions according to an embodiment of the present invention. The structures of the transmitter and the receiver of the mobile station performing functions illustrated in FIG. 3 according to an embodiment of the present invention are identical to the structures of the transmitter and the receiver illustrated in FIG. 1, except for a feedback information processor 307, which is newly added to FIG. 3, and an operation of a transmission beam generator 305, which creates a transmission beam by using feedback transmission weights.

Prior to explaining FIG. 3, it is noted that the following description is made on the assumption that the CDMA mobile communication system utilizes the MIMO-AAA scheme. Accordingly, the transmitter and the receiver must have a plurality of transmission antennas and reception antennas, respectively. However, according to FIG. 3, the transmitter and the receiver do not individually have transmission antennas and reception antennas, but the same antennas are used for both transmitter and receiver through a time division scheme by using a duplexer. In addition, according to FIG. 3, N antennas are used.

Referring to FIG. 3, the transmitter includes an encoder 301, an interleaver 303, a transmission beam generator 305, a feedback information processor 307, a plurality of spreaders, including first to $N^{th}$ spreaders 311, 321, . . . , and 331, and N RF processors, including first to $N^{th}$ RF processors 313, 323, . . . , and 333. In addition, a duplexer 340 and N antennas, including first to $N^{th}$ antennas 341, 343 , . . . , and 345, are commonly used for both transmitter and receiver. Herein, the structure and the operation of the encoder 301, the interleaver 303, the first to $N^{th}$ spreaders 311, 321, . . . , and 331, and the first to $N^{th}$ RF processors 313, 323, . . . , and 333 are identical to the structure and the operation of the encoder 201, the interleaver 203, the first to $N^{th}$ spreaders 211, 221, . . . , and 231, and the first to $N^{th}$ RF processors 213, 223, . . . , and 233 illustrated in FIG. 2. Therefore, a detailed description thereof will be omitted here.

The feedback information processor 307 analyzes feedback information received in the receiver of the mobile station in order to detect transmission weights $w_{T,k}$ included in the feedback information. In addition, the feedback information processor 307 sends the detected transmission weights $w_{T,k}$ to the transmission beam generator 305. A procedure of receiving feedback information in the receiver of the mobile station will be described in more detail later. Therefore, a detailed description thereof will be omitted for now.

The transmission beam generator 305 creates a transmission beam corresponding to the transmission weights $w_{T,k}$.

The receiver includes N RF processors, including first to $N^{th}$ RF processors 351, 361, . . . , and 371, N multipath searchers, including first to $N^{th}$ multipath searchers 353, 363, . . . , 373, which correspond to the RF processors, L fingers, including first to $L^{th}$ fingers 380-1, 380-2, . . . , 380-L, for processing signals regarding L multipaths, which are searched by the multipath searchers, a multipath combiner 391 for combining multipath signals output from the L fingers, a de-interleaver 393, and a decoder 395. Herein, the structure and the operation of the first to $N^{th}$ RF processors 351, 361, . . . , and 371, the first to $N^{th}$ multipath searchers 353, 363, . . . , 373, the first to $L^{th}$ fingers 380-1, 380-2, . . . , 380-L, the multipath combiner 391, the de-interleaver 393 and the decoder 395 are identical to the structure and the operation of the first to $N^{th}$ RF processors 251, 261, . . . , and 271, the first to $N^{th}$ multipath searchers 253, 263, . . . , 273, the first to $L^{th}$ fingers 280-1, 280-2, . . . , 280-L, the multipath combiner 291, the de-interleaver 293 and the decoder 295 illustrated in FIG. 2. Therefore, a detailed description thereof will be omitted here.

Reception data finally output from the decoder 395 is feedback information including the transmission weights $w_{T,k}$, and the feedback information output from the decoder 395 is input to the feedback information processor 307.

FIG. 3 illustrates a case in which the receiver of the mobile station receives the feedback information and the transmitter of the mobile station creates the transmission beam by using the transmission weights $w_{T,k}$ included in the feedback information. However, the receiver and the transmitter of the mobile station can be used as the receiver and the transmitter of the base station. That is, it is noted that the above description has been made in view of reception of the feedback information including the transmission weights $w_{T,k}$ with reference to FIG. 3. Hereinafter, the process in which the transmission weight information is generated and transmitted through the transmitter and receiver of the transmission side and the reception side according to the present invention will be described with reference to FIGS. 2 and 3.

The receiver illustrated in FIG. 2 calculates an error value of the received signal through the above-described process and determines the reception weight and the transmission weight using the error values obtained through the combinational method. The transmission weight is transmitted as feedback information data by the transmitter illustrated in FIG. 2 and is then received by the receiver illustrated in FIG. 3. The transmission weight received by the receiver illustrated in FIG. 3 is input to the transmission beam generator of the transmitter illustrated in FIG. 3 and serves as a transmission weight for creating a transmission beam for each antenna.

As described above, the system illustrated in FIG. 2 may be a base station or a mobile station, and the system illustrated in FIG. 3 also may be a base station or a mobile station. That is, when the system illustrated in FIG. 2 is a base station, the base station calculates a transmission weight from data received by the base station and then transmits the transmission weight to a mobile station, and the mobile station reflects the received transmission weight in creation of a transmission beam for data transmission. Conversely, when the system illustrated in FIG. 2 is a mobile station, the mobile station calculates a transmission weight of data to be transmitted by a base station from data received by the mobile station and then transmits the transmission weight to the base station, and the base station reflects the received transmission weight in creation of a transmission beam for transmission of the data.

Figure 4:
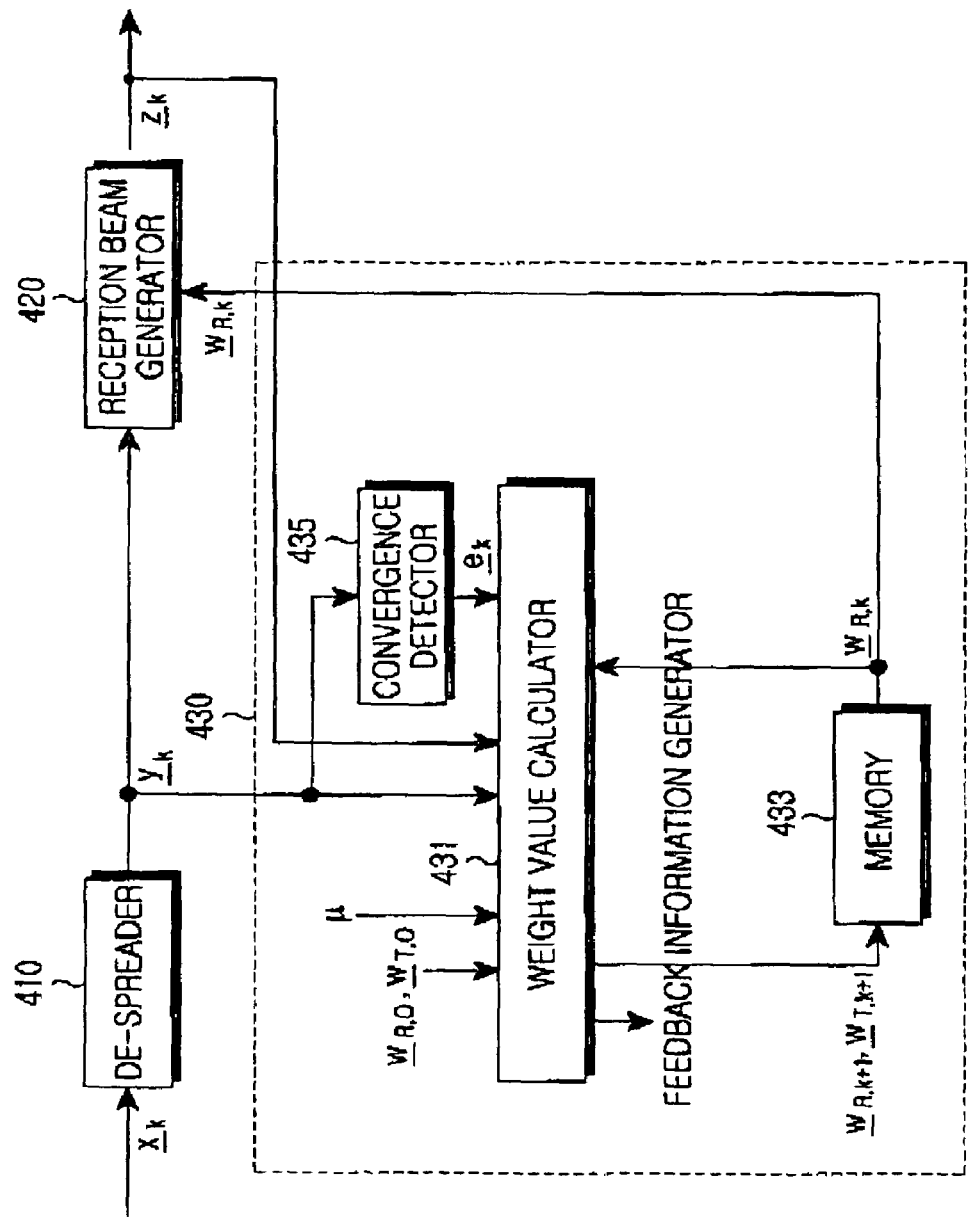
FIG. 4 is a block diagram illustrating a structure of a signal processor performing functions according to an embodiment of the present invention.

FIG. 4 is a block diagram illustrating the structure of the signal processor performing functions according to the present invention. For convenience of explanation, only parts of the receiver of the base station that are in direct relation to the present invention will be described with reference to FIG. 4. Because the above description has been made for a case in which the receiver of the base station calculates the transmission weights $w_{T,k}$, the description of the signal processor illustrated in FIG. 4 will be made in relation to the parts of the receiver of the base station. However, the signal processor illustrated in FIG. 4 may be adaptable for the receiver of the mobile station.

Referring to FIG. 4, when reception signals $x_k$ are input into the receiver at a predetermined point (k), the despreader 410 despreads the reception signals $x_k$ using a predetermined despreading code and outputs despread reception signals $y_k$ to the signal processor 430 and the reception beam generator 420. The signal processor 430 includes a weight calculator 431, a memory 433, and an error value combiner 435. For convenience of explanation, the signal processor 430 illustrated in FIG. 4 will be described in relation to the structure of the first finger 280-1 of the base station receiver illustrated in FIG. 2. Therefore, although only one despreader 410 is illustrated in FIG. 4, the despreader 410 may perform an operation substantially identical to the operation of the first to $N^{th}$ despreaders 281 to 283 of the first finger 280-1.

The weight calculator 431 of the signal processor 430 receives the despread reception signals $y_k$, calculates reception weights $w_{R,k}$ and transmission weights $w_{T,k}$ by applying a predetermined constant gain value µ, initial weights $w_{R,o}$ and output signals $z_k$ of the first finger 280-1 output from the reception beam generator 420 to the despread reception signals $y_k$, and outputs the calculated reception weights $w_{R,k}$ and transmission weights $w_{T,k}$ to the memory 433. The memory 433 performs a buffering operation for the reception weights $w_{R,k}$ and transmission weights $w_{T,k}$ calculated by the weight calculator 431, and the weight calculator 431 may use the reception weights $w_{R,k}$ and transmission weights $w_{T,k}$ stored in the memory 433 when updating the reception weights $w_{R,k}$ and transmission weights $w_{T,k}$. That is, the weight calculator 431 updates the reception weights $w_{R,k}$ and transmission weights $w_{T,k}$ at a next point (k+1) by using the reception weights $w_{R,k}$ and transmission weights $w_{T,k}$ calculated at a predetermined point k.

The weight calculator 431 calculates the weights through a proper combination of the CM scheme and the DD scheme. That is, the weight calculator 431 calculates the reception weight $w_{R,k}$ and the transmission weight $w_{T,k}$ under the control of the error value combiner 435. The error value combiner 435 determines the scheme according to which the weight calculator 431 must calculate the reception weight $w_{R,k}$ and the transmission weight $w_{T,k}$.

As described above, the CM scheme is defective in that it has a slow converging speed, and the DD scheme is defective in that it is highly probable for the DD scheme to fail to converge a signal in a high order modulation environment or a fast fading environment, such as a fast fading channel. Therefore, the present invention employs the error value combiner 435 in order to combine the CM scheme and the DD scheme using a proper function (e.g., sigmoid function), thereby controlling signals to be converged into a relatively small MSE value. Therefore, differentiation of the CM scheme and the DD scheme is very important for improving performance.

Figure 5:
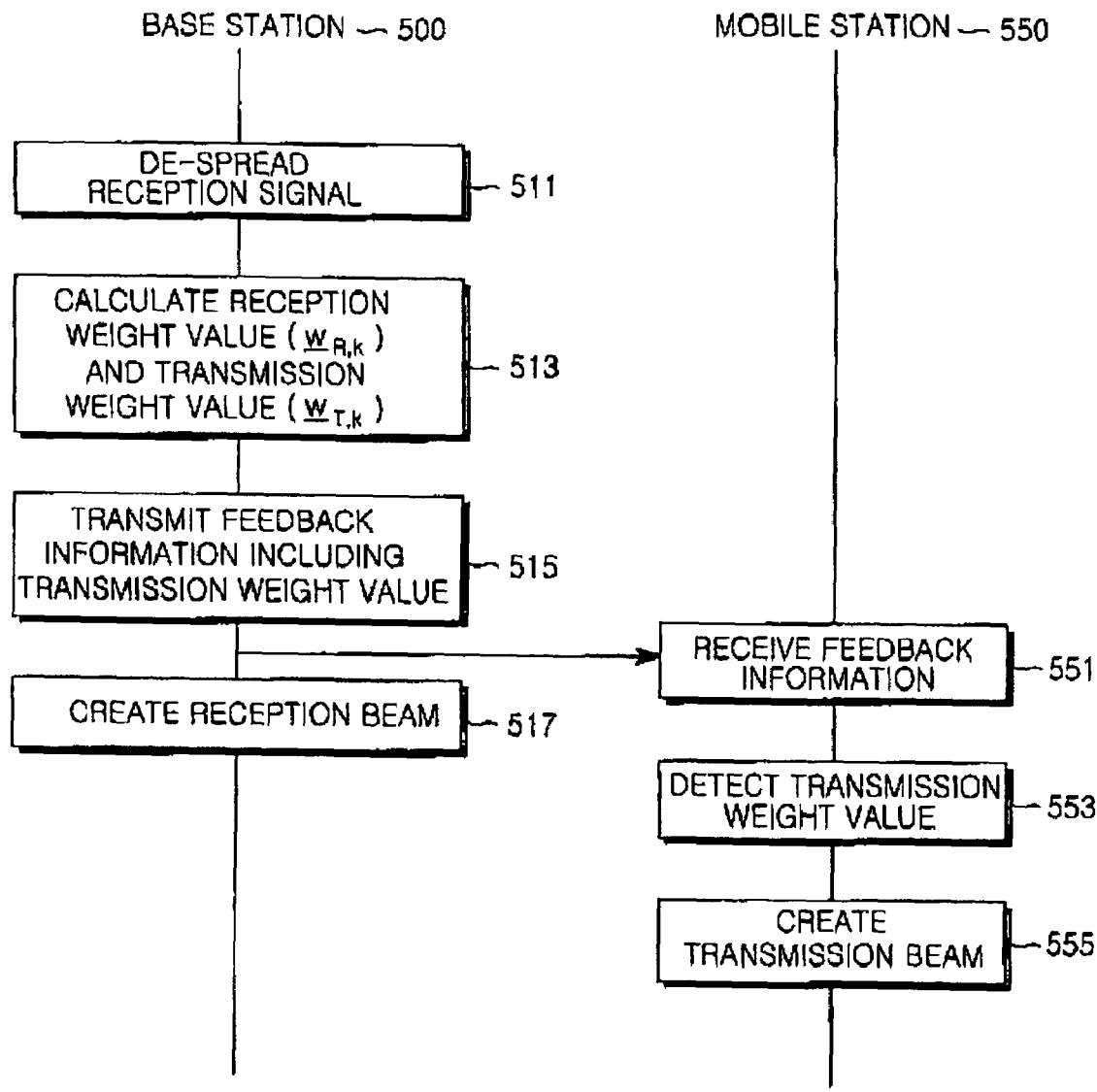
FIG. 5 is a block diagram illustrating a data transmitting/receiving procedure using an MIMO-AAA scheme according to an embodiment of the present invention.

FIG. 5 is a block diagram illustrating a data transmitting and receiving procedure using the MIMO-AAA scheme according to one embodiment of the present invention. Referring to FIG. 5, a base station 500 despreads reception signals in step 511, and calculates the reception weights $w_{R,k}$ and transmission weights $w_{T,k}$ by using the despread reception signals in step 513. In addition, the base station 500 creates feedback information including the transmission weights $w_{T,k}$ and sends the feedback information to a mobile station 550 in step 515.

The mobile station 550 receives the feedback information from the base station 500 in step 551 and detects the transmission weights $w_{T,k}$ from the feedback information in step 553. In addition, the mobile station 550 creates a transmission beam by using the detected transmission weights $w_{T,k}$ in step 555. Although FIG. 5 illustrates a case in which the base station 500 feeds the transmission weights $w_{T,k}$ to the mobile station 550 and the mobile station 550 creates the transmission beam by using the transmission weights $w_{T,k}$, it is also possible to allow the mobile station 550 to feed the transmission weights $w_{T,k}$ to the base station 500 and allow the base station 500 to create the transmission beam by using the transmission weights $w_{T,k}$. Therefore, as described above, the base station 500 and the mobile station 550 may exchange their functions. That is, the mobile station 550, instead of the base station 500, may despread the reception signal, calculate the transmission weight from the despread signal, and transmit the feedback information including the calculated transmission weight to the base station 500, and the base station 500 may receive the feedback information, detect the transmission weight from the feedback information, and generate the transmission beam.

Hereinafter, a signal receiving procedure of a base station receiver according to an embodiment of the present invention will be described with reference to FIG. 6. However, prior to giving description with reference to FIG. 6, because FIG. 2 illustrates a case in which the base station receiver creates the feedback information, the signal receiving procedure of the base station receiver will be described with reference to FIG.

6. Herein, it is noted that the same signal receiving procedure may be realized even if the mobile station receiver creates the feedback information.

Figure 6:
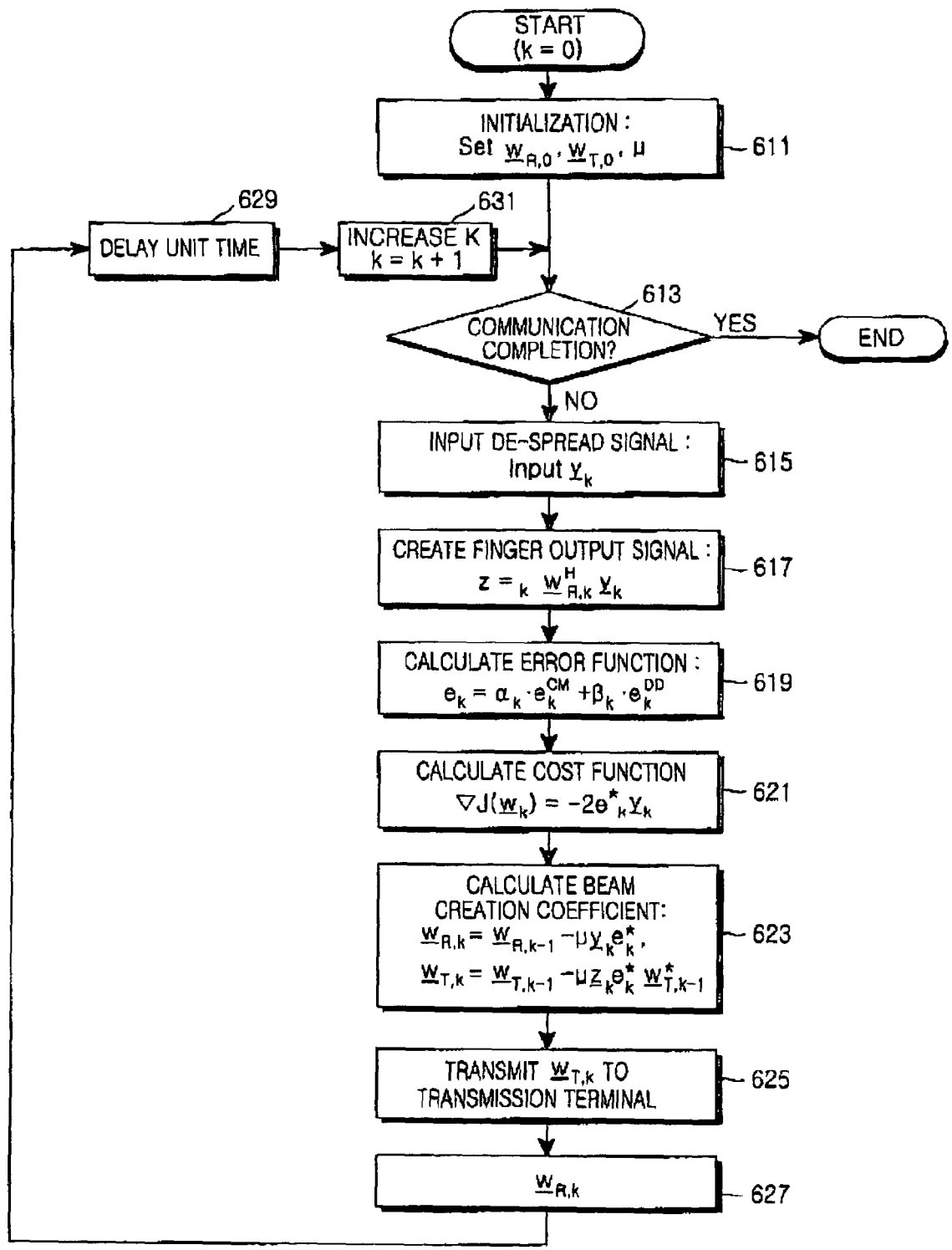
FIG. 6 is a flowchart illustrating a signal receiving procedure of a base station receiver according to an embodiment of the present invention.

FIG. 6 is a flowchart illustrating the signal receiving procedure of the base station receiver according to an embodiment of the present invention. Referring to FIG. 6, in step 611, the base station receiver sets up initial weights $w_{R,0}$, $w_{T,0}$ and the constant gain value $\mu$. In step 613, the base station receiver checks if communication has been completed. If communication has been completed, the base station receiver finishes the signal receiving procedure. However, when the communication has not been completed, in step 615, the base station receiver receives the despread signals $y_k$ of the reception signals $x_k$.

In step 617, the base station receiver calculates $z_k$, which is a set of output signals $z_k$ output from each of the fingers provided in the base station receiver, by using the despread signals $y_k$ and the reception weights $w_{R,k}$ ($z_k = w_k^H y_k$). Herein, $z_k$ is a set of the output signals of the fingers generated by the reception beam, which is created by using the reception weights $w_{R,k}$.

In step 619, the base station receiver calculates the minimum error function $e_k + \alpha_k \cdot e_k^{CM} + \beta_k \cdot e_k^{DD}$ using the CM scheme and the DD scheme. Here, the minimum error function $e_k$ is obtained by applying a weight of $\alpha_k$ to the error value $e_k^{CM}$ of the reception signal obtained through calculation using the CM scheme and applying a weight of $\beta_k$ represents to the error value $e_k^{DD}$ of the reception signal obtained through calculation using the CM scheme and then adding the weighted error values to each other, as described for Equation 27.

In step 621, the base station receiver calculates a differential value of the cost function using the despread signals $y_k$ and the error function $e_k$, ($\nabla J(w_{R,k}) = -2e_k^* y_k$). In step 623, the base station receiver calculates a beam creation coefficient, that is, calculates the reception weight $w_{R,k}$ and the transmission weights $w_{T,k}$ ($w_{R,k} = w_{R,k-1} - \mu y_k e_k^*$, $w_{T,k} = w_{T,k-1} - \mu z_k e_k^* w_{T,k}^*$).

In step 625, the base station receiver transmits the calculated transmission weight $w_{T,k}$ to a transmission terminal, i.e., the transmitter of the mobile station, and maintains the calculated reception weight $w_{R,k}$. In step 629, the base station receiver delays a predetermined unit time period set in advance. Here, the delay is intended to enable a value determined in the K-th time interval to be used in the (K+1)-th time interval, that is, to consider a state transition delay time. In step 631, the base station receiver increases the K value by 1, which means that the base station receiver shifts from the time point K to the time point (K+1), and then returns to step 613.

According to the present invention, when calculating the error value in step 619, a combinational method in which two schemes, e.g., the CM scheme and the DD scheme, are combined is used and weights are differentially applied according to the sigmoid function. Further, in step 623, not only the reception weight $w_{R,k}$ but also the transmission weight $w_{T,k}$ are calculated, and the calculated transmission weight $w_{T,k}$ is transmitted to the transmission terminal.

Figure 10:
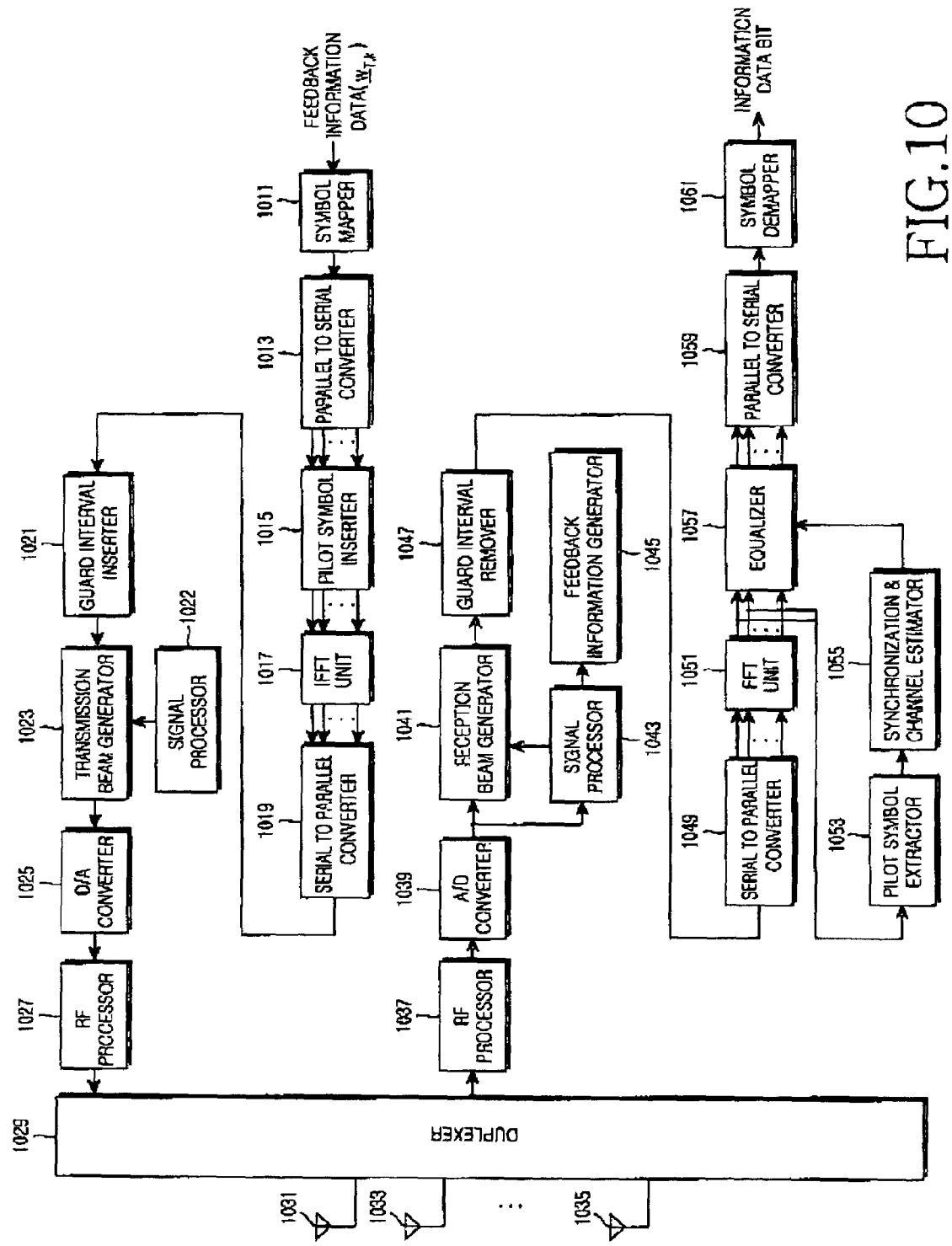
FIG. 10 is a block diagram illustrating structures of a base station transmitter and a base station receiver of an OFDM mobile communication system performing functions according to an embodiment of the present invention.

FIG. 10 is a block diagram illustrating structures of the base station transmitter and the base station receiver of the mobile communication system performing functions according to an embodiment of the present invention. However, prior to describing FIG. 10, it is noted that the base station transmitter and the base station receiver illustrated in FIG. 10 may be operated in the substantially same manner as the base station transmitter and the base station receiver of the CDMA mobile communication system described with reference to FIG. 2 even though the structures of the base station transmitter and the base station receiver illustrated in FIG. 10 are different from the structures of the base station transmitter and the base station receiver illustrated in FIG. 2. That is, similarly to the base station transmitter and the base station receiver of the CDMA mobile communication system, the base station transmitter and the base station receiver of the OFDM mobile communication system can calculate the reception weights $w_{R,k}$ and the transmission weights $w_{T,k}$ and can transmit the calculated transmission weights $w_{T,k}$ to the mobile station.

In addition, it is also noted that the following description is made on the assumption that the OFDM mobile communication system utilizes the MIMO-AAA scheme. Accordingly, the transmitter and the receiver must have a plurality of transmission antennas and reception antennas, respectively. However, according to FIG. 10, the transmitter and the receiver do not individually have transmission antennas and reception antennas, but the same antennas are used for both transmitter and receiver through a time division scheme using a duplexer. In addition, according to FIG. 10, N antennas are used.

Referring to FIG. 10, the base station transmitter includes a symbol mapper 1011, a serial to parallel converter 1013, a pilot symbol inserter 1015, an inverse fast Fourier transform (IFFT) unit 1017, a parallel to serial converter 1019, a guard interval inserter 1021, a transmission beam generator 1023, a signal processor 1022, a digital to analog converter 1025, and an RF processor 1027. In addition, a duplexer 1029 and N antennas, including first to $N^{th}$ antennas 1031, 1033, ..., and 1035, are commonly used for both base station transmitter and base station receiver.

If information data bits to be transmitted are created, that is, if feedback information data including the transmission weights $w_{T,k}$ is created, the feedback information data is input into the symbol mapper 1011. Upon receiving the feedback information data, the symbol mapper 1011 modulates the feedback information data through a predetermined modulation method in order to achieve symbol transform with respect to the feedback information data and outputs serial modulation symbols to the serial to parallel converter 1013. The predetermined modulation method may include QPSK (quadrature phase shift keying) method or 16QAM (quadrature amplitude modulation) method. Upon receiving the serial modulation symbols from the symbol mapper 1011, the serial to parallel converter 1013 converts the serial modulation symbols into parallel modulation symbols and outputs the parallel modulation symbols to the pilot symbol inserter 1015. The pilot symbol inserter 1015 inserts pilot symbols into the parallel modulation symbols output from the serial to parallel converter 1013 and outputs the parallel modulation symbols having the pilot symbols to the IFFT unit 1017.

Upon receiving the signal from the pilot symbol inserter 1015, the IFFT unit 1017 performs N-point IFFT with respect to the signal and outputs the signal to the parallel to serial converter 1019. Therefore, the parallel to serial converter 1019 receives the signal output from the IFFT unit 1017, converts the parallel signal to a serial signal, and outputs the serial signal to the guard interval inserter 1021. Upon receiving the serial signal from the parallel to serial converter 1019, the guard interval inserter 1021 inserts a guard interval signal into the serial signal, and outputs the signal including the guard interval signal to the signal processor 1022. Therefore, the signal processor 1022 calculates a weight based on the signal output from the guard interval inserter 1021 and outputs the signal to the transmission beam generator 1023.

The transmission beam generator 1023 generates a transmission beam based on the signal output from the guard interval inserter 1021 and the weight calculated in the signal processor 1022 and outputs the transmission beam to the digital to analog converter 1025 such that the transmission beam can be transmitted to each of the first to $N^{th}$ antennas 1031, 1033, . . . , and 1035. The transmission beam generator 1023 may create the transmission beam by separately calculating the weights for the transmission beam. However, a detailed procedure of creating the transmission beam does not directly relate to the present invention; therefore, it will not be further described below.

If the base station receiver has previously received the feedback information data from the mobile station transmitter, the transmission beam generator 1023 may create the transmission beam by using the transmission weight $w_{T,k}$ included in the feedback information data.

In addition, a guard interval must be inserted into the signal to be transmitted in order to prevent interference between previous OFDM symbols transmitted at a previous OFDM symbol transmission time and present OFDM symbols to be transmitted at a present OFDM symbol transmission time, when transmitting the OFDM symbols in the OFDM mobile communication system. The guard interval may be inserted into the signal through a "cyclic prefix" method in which predetermined aft samples of the OFDM symbols provided in a time region are copied in order to be inserted into an effective OFDM symbol, or through a "cyclic postfix" method in which predetermined samples of the OFDM symbols provided in the time region are copied in order to be inserted into the effective OFDM symbol.

The digital to analog converter 1025 receives the signal output from the transmission beam generator 1023 in order to convert the signal into an analog signal, and outputs the analog signal to the RF processor 1027. The RF processor 1027 may include a filter and a front end unit in order to perform an RF-treatment process with respect to the signal output from the digital to analog converter 1025 in such a manner that the signal can be transmitted through the air. The RF processor 1027 outputs the signal to the duplexer 1029. Therefore, the duplexer 1029 receives the signal from the RF processor 1027 and transmits the signal via the antennas at a corresponding signal transmission time.

The base station receiver includes the duplexer 1029, an RF processor 1037, an analog to digital (A/D) converter 1039, a reception beam generator 1041, a signal processor 1043, a guard interval remover 1047, a serial to parallel converter 1049, a fast Fourier transform (FFT) unit 1051, a pilot symbol extractor 1053, a synchronization & channel estimator 1055, an equalizer 1057, a parallel to serial converter 1059, and a symbol demapper 1061.

The signal transmitted from the mobile station transmitter is received in the base station receiver through antennas of the base station receiver while passing through a multipath channel at which noise is added to the signal. The signal received in the base station receiver through the antennas is input into the duplexer 1029. The duplexer 1029 outputs the signal, which has been received in the base station receiver through the antennas at a corresponding signal receiving time, to the RF processor 1037.

Upon receiving the signal from the duplexer 1029, the RF processor 1037 down-converts the signal such that the signal has an intermediate frequency band and outputs the down-converted signal to the analog to digital converter 1039. Therefore, the analog to digital converter 1039 converts the analog signal output from the RF processor 1037 into a digital signal and outputs the digital signal to the reception beam generator 1041 and the signal processor 1043. Upon receiving the signal from the analog to digital converter 1039, the signal processor 1043 calculates the reception weights $w_{R,k}$, and then, calculates the transmission weights $w_{T,k}$ by using the reception weights $w_{R,k}$.

Thereafter, the signal processor 1043 outputs the transmission weights $w_{T,k}$ to the feedback information generator 1045. As a result, the feedback information generator 1045 creates feedback information including the transmission weights $w_{T,k}$. The feedback information created from the feedback information generator 1045 is transmitted from the base station transmitter. For example, such feedback information can be transmitted through a dedicated physical channel.

The signal output from the reception beam generator 1041 is input into the guard interval remover 1047. That is, the guard interval remover 1047 receives the signal from the reception beam generator 1041 in order to remove the guard interval signal. Thereafter, the guard interval remover 1047 outputs the signal to the serial to parallel converter 1049. The serial to parallel converter 1049 converts the serial signal output from the guard interval remover 1047 into the parallel signal and outputs the parallel signal to the FFT unit 1051.

Upon receiving the parallel signal from the guard interval remover 1047, the IFFT unit 1047 performs N-point IFFT with respect to the parallel signal and outputs the signal to the equalizer 1057 and the pilot symbol extractor 1053. The equalizer 1057 receives the signal output from the IFFT unit 1047 and performs a channel equalization with respect to the signal.

After the channel equalization has been completed, the equalizer 1057 outputs the signal to the parallel to serial converter 1059. The parallel to serial converter 1059 receives the parallel signal from the equalizer 1057 and converts the parallel signal into the serial signal. The parallel to serial converter 1059 outputs the serial signal to the symbol demapper 1061. Upon receiving the signal from the parallel to serial converter 1059, the demapper 1061 demodulates the signal through a predetermined demodulation method corresponding to the modulation method applied to the mobile station transmitter, thereby outputting reception information data bits.

In addition, the signal output from the FFT unit 1051 is input into the pilot symbol extractor 1053. The pilot symbol extractor 1053 detects pilot symbols from the signal output from the FFT unit 1051 and outputs the detected pilot symbols to the synchronization & channel estimator 1055. In addition, the synchronization & channel estimator 1055 performs synchronization and channel estimation by using the pilot symbols output from the pilot symbol extractor 1053 and outputs data thereof to the equalizer 1057.

FIG. 10 illustrates a case in which the base station receiver calculates the transmission weights $w_{T,k}$ and transmits the transmission weights $w_{T,k}$ to the base station transmitter. However, the base station receiver and the base station transmitter can be used as the mobile station receiver and the mobile station transmitter, respectively. That is, it is noted that the above description has been made in view of creation and transmission of feedback information with reference to FIG. 10.

Figure 11:
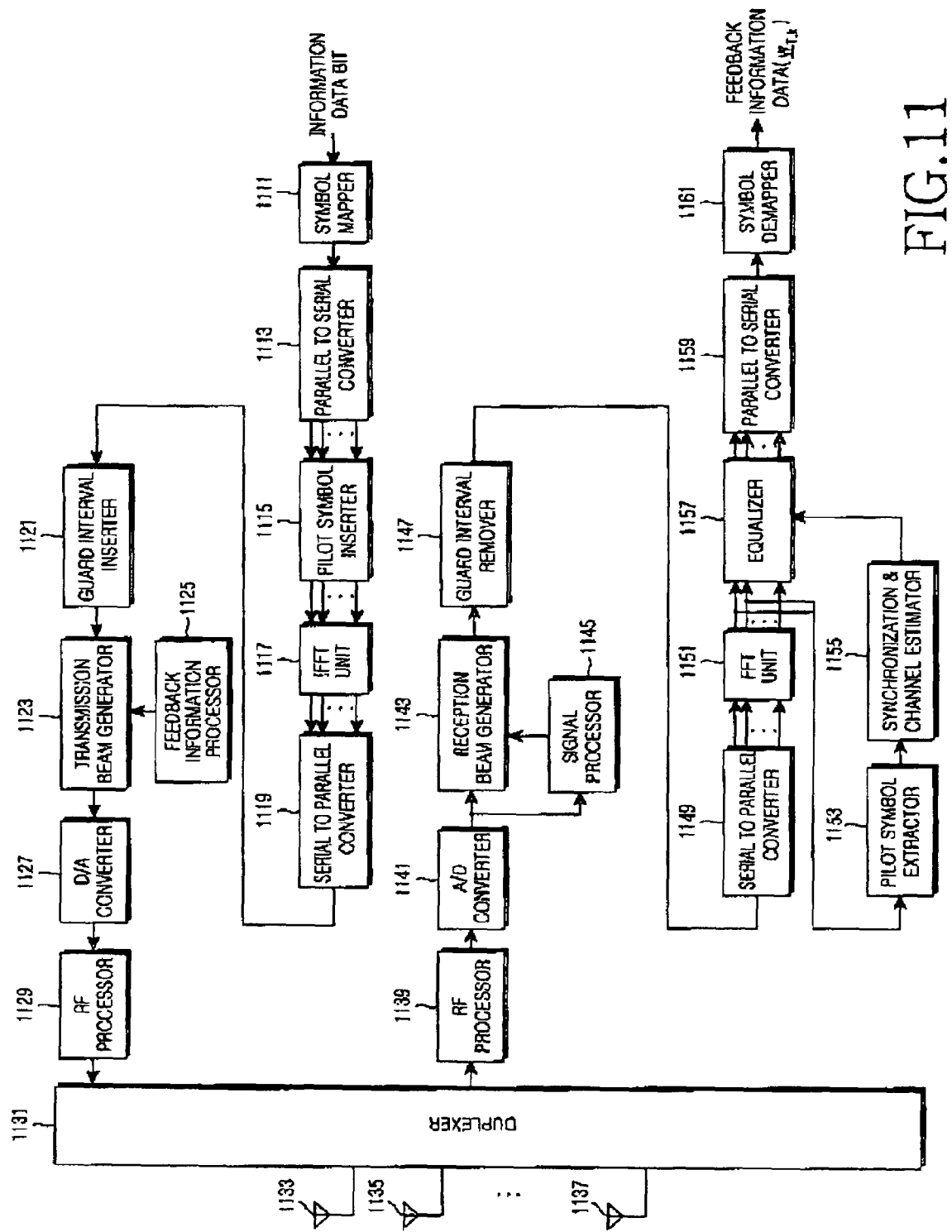
FIG. 11 is a block diagram illustrating structures of a mobile station transmitter and a mobile station receiver of an OFDM mobile communication system performing functions according to an embodiment of the present invention.

FIG. 11 is a block diagram illustrating structures of the mobile station transmitter and the mobile station receiver of the OFDM mobile communication system performing functions according to an embodiment of the present invention. However, prior to describing FIG. 11, it is noted that the following description is made on the assumption that the OFDM mobile communication system utilizes the MIMO-AAA scheme. Accordingly, the transmitter and the receiver must have a plurality of transmission antennas and reception antennas, respectively. However, according to FIG. 11, the transmitter and the receiver do not individually have transmission antennas and reception antennas, but the same antennas are used for both transmitter and receiver through a time division scheme by using a duplexer. In addition, according to FIG. 11, N antennas are used.

Referring to FIG. 11, the mobile station transmitter includes a symbol mapper 1111, a serial to parallel converter 1113, a pilot symbol inserter 1115, an IFFT unit 1117, a parallel to serial converter 1119, a guard interval inserter 1121, a transmission beam generator 1123, a feedback information processor 1125, a digital to analog converter 1127, and an RF processor 1129. In addition, a duplexer 1131 and N antennas, including first to $N^{th}$ antennas 1133, 1135, ..., and 1137, are commonly used for both mobile station transmitter and mobile station receiver.

The operation and the structure of the symbol mapper 1111, the serial to parallel converter 1113, the pilot symbol inserter 1115, the IFFT unit 1117, the parallel to serial converter 1119, the guard interval inserter 1121, the transmission beam generator 1123, the digital to analog converter 1127, the RF processor 1129, and the duplexer 1131 are identical to the operation and the structure of the symbol mapper 1011, the serial to parallel converter 1013, the pilot symbol inserter 1015, the IFFT unit 1017, the parallel to serial converter 1019, the guard interval inserter 1021, the transmission beam generator 1023, the digital to analog converter 1025, the RF processor 1027 and the duplexer 1029 illustrated in FIG. 10. Therefore, a detailed description thereof will be omitted here.

The feedback information processor 1125 analyzes feedback information received in the mobile station receiver in order to detect transmission weights $w_{T,k}$ included in the feedback information. In addition, the feedback information processor 1125 sends the detected transmission weights $w_{T,k}$ to the transmission beam generator 1123. A procedure of receiving feedback information in the mobile station receiver will be described in detail later. Therefore, a detailed description thereof will be omitted now. The transmission beam generator 1123 creates the transmission beam corresponding to the transmission weights $w_{T,k}$.

The mobile station receiver includes an RF processor 1139, an analog to digital converter 1141, a reception beam generator 1143, a signal processor 1145, a guard interval remover 1147, a serial to parallel converter 1149, an FFT unit 1151, a pilot symbol extractor 1153, a synchronization & channel estimator 1155, an equalizer 1157, a parallel to serial converter 1159, and a symbol demapper 1161. The operation and the structure of the RF processor 1139, the analog to digital converter 1141, the reception beam generator 1143, the signal processor 1145, the guard interval remover 1147, the serial to parallel converter 1149, the FFT unit 1151, the pilot symbol extractor 1153, the synchronization & channel estimator 1155, the equalizer 1157, the parallel to serial converter 1159, and the symbol demapper 1161 are identical to the operation and the structure of the RF processor 1037, the analog to digital converter 1039, the reception beam generator 1041, the signal processor 1043, the guard interval remover 1047, the serial to parallel converter 1049, the FFT unit 1051, the pilot symbol extractor 1053, the synchronization & channel estimator 1055, the equalizer 1057, the parallel to serial converter 1059, and the symbol demapper 1061 illustrated in FIG. 10. Therefore, a detailed description thereof will be omitted.

Herein, reception data finally output from the symbol demapper 1161 are feedback information including the transmission weights $w_{T,k}$, and the feedback information output from the symbol demapper 1161 is input to the feedback information processor 1125.

FIG. 11 illustrates a case in which the mobile station receiver receives the feedback information and the mobile station transmitter creates the transmission beam by using the transmission weights $w_{T,k}$ included in the feedback information. However, the mobile station receiver and the mobile station transmitter can be used as the base station receiver and the base station transmitter. That is, it is noted that the above description has been made in view of reception of the feedback information including the transmission weights $w_{T,k}$ with reference to FIG. 11.

Figure 12:
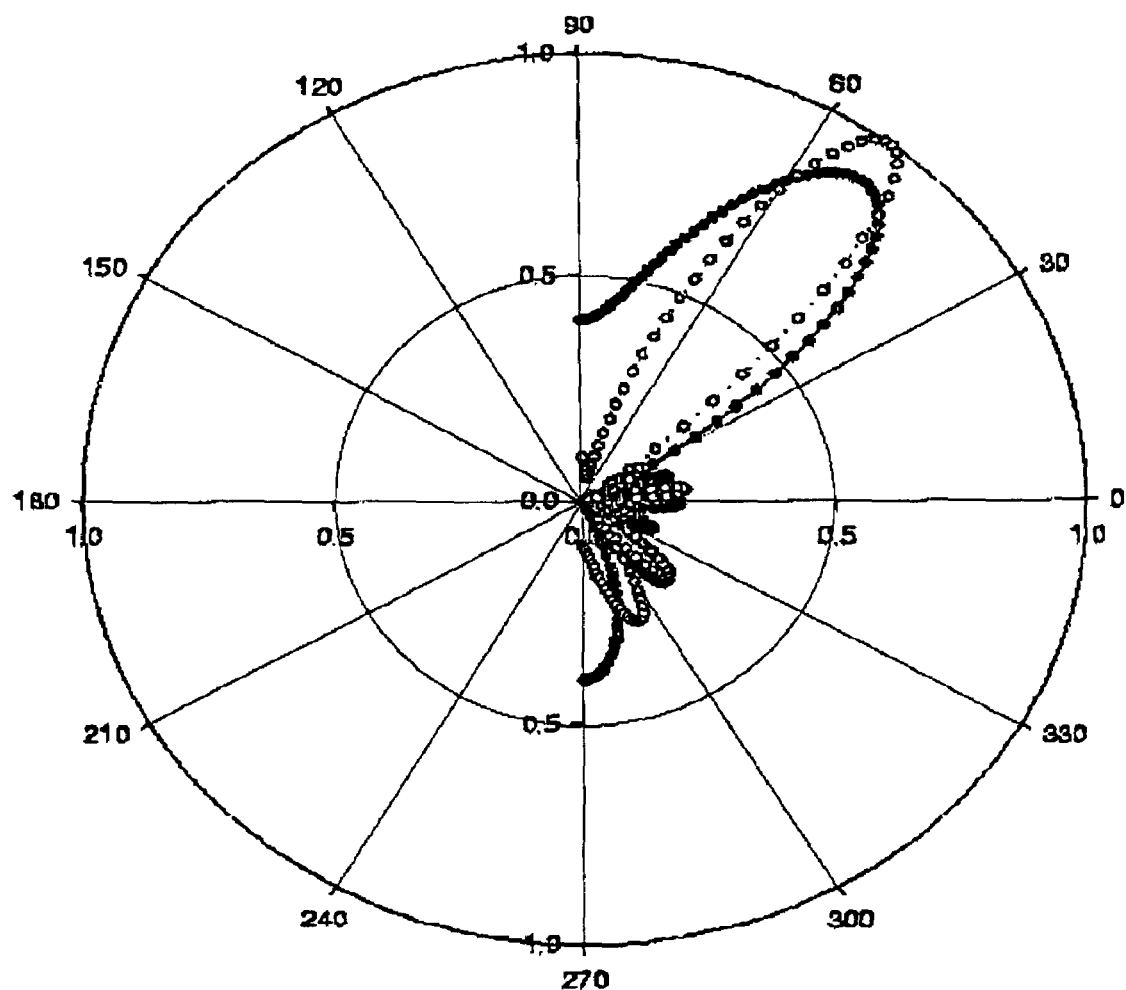
FIG. 12 is a graph illustrating a characteristic curve of a combination-type weight creation method of the present invention according the number of reception antennas of a base station.

FIG. 12 is a graph illustrating a characteristic curve of the combination-type weight creation method of the present invention according the number of reception antennas of the base station. More specifically, FIG. 12 illustrates radiation patterns represented when six reception antennas or ten reception antennas are provided in the base station receiver. For example, if a predetermined mobile station is positioned at a point of 57°, a normalized antenna gain may increase by 0.2 when providing ten antennas in the base station receiver, as compared with a case in which six antennas are provided in the base station receiver.

In addition, it is possible to precisely create the reception beam when providing ten antennas in the base station receiver. In view of system capacity of the mobile communication system, intensity of the reception signal can be greatly amplified as the number of the reception antennas increases, such that it is possible to precisely provide communication services and to increase the system capacity.

As described above, according to the present invention, the weights can be created through the combination-mode weight creation method, in which the weights are differentially applied to two combined schemes, e.g., the CM scheme and the DD scheme, through a sigmoid function, thereby more rapidly creating the weights having a minimum MSE value than in a method using either only one scheme or two converted schemes. Accordingly, it is possible to precisely create the reception beam, such that the receiver can receive only desired signals and the system performance is improved.

In addition, according to the present invention, the transmission weights created in the receiver using the reception weights can be fedback to the transmitter, such that the transmitter also can use the transmission weights. Accordingly, it is not necessary for the transmitter to perform a separate process for calculating the transmission weight, so that an operation load of the calculation of the transmission weight can be reduced.

While the present invention has been shown and described with reference to certain preferred embodiments thereof, it will be understood by those skilled in the art that various changes in form and details may be made therein without departing from the spirit and scope of the present invention as defined by the appended claims.

What is claimed is:

1. A method for transmitting and receiving weight information for creating transmission and reception beams in a wireless communication system using an adaptive antenna array scheme, the method comprising the steps of:

(1) providing a first weight to a first error value obtained through a calculation for achieving a minimum cost function by a first scheme;

(2) providing a second weight calculated from the first weight to a second error value obtained through a calculation for achieving a minimum cost function by a second scheme;

(3) calculating a minimum error value from the weighted first error value and the weighted second error value for minimizing an error of a received signal;

(4) calculating a reception weight for creating a reception beam using the received signal and the minimum error value;
(5) calculating a transmission weight for creating of a transmission beam using the reception weight and a minimum error value of a received signal;
(6) generation feedback information including the transmission weight; and
(7) transmitting the feedback information.

2. The method as claimed in claim 1, wherein the first error value and the second error value have a relation of a sigmoid function between them.

3. The method as claimed in claim 1, wherein the minimum error value is calculated by, $e_k = \alpha_k \cdot e_k^{CM} + \beta_k \cdot e_k^{DD}$, wherein $\alpha_k = g(|e_k^{DD}|)$, $$\beta_k = (1 - g(|e_k^{DD}|))\frac{|e_k^{CM}|}{|e_k^{DD}|}, \text{ and}$$

$$g(x) = \frac{1}{1 + e^{-a(x-0.5)}}, a > 0,$$

wherein $e_k$ represents the minimum error value, $e_k^{CM}$ represents the first error value obtained through the calculation using the first scheme, $e_k^{DD}$ represents the second error value obtained through the calculation using the second scheme, $\alpha_k$ represents the first weight, and $\beta_k$ represents the second weight.

4. The method as claimed in claim 1, wherein the first scheme is a CM (constant modulus) scheme and the second scheme is a decision-directed (DD) scheme.

5. The method as claimed in claim 1, wherein the received signal is generated by despreading a spread-spectrum modulated signal.

6. The method as claimed in claim 1, wherein each of the error values includes a mean square error value.

7. A method for transmitting and receiving a signal in a wireless communication system including a first apparatus and a second apparatus using an adaptive antenna array scheme, the first apparatus including a first transmitter and a first receiver, the second apparatus including a second transmitter and a second receiver, the method comprising the steps of:
(1) applying weights by the first receiver to a first scheme and a second scheme for minimizing an error of a received signal, thereby obtaining a minimum error value;
(2) producing a reception weight for creation of a reception beam by the first apparatus through a calculation using the received signal and the minimum error value, and producing a transmission weight for creating a transmission beam by the second apparatus through a calculation using the reception weight and the minimum error value;
(3) generating feedback information including the transmission weight of the second apparatus; and
(4) transmitting the feedback information from the first transmitter to the second receiver;
(5) receiving the feedback information by the second receiver; and
(6) obtaining, by the second apparatus, the transmission weight from the feedback information, generating the transmission beam correspondingly to the transmission weight, and transmitting a signal of the transmission beam via the second transmitter to the first apparatus.

8. The method as claimed in claim 7, wherein, step (1) comprises the steps of:
providing a first weight to a first error value obtained through a calculation for achieving a minimum cost function by the first scheme;
providing a second weight calculated from the first weight to a second error value obtained through a calculation for achieving a minimum cost function by the second scheme; and
calculating the minimum error value from the weighted first error value and the weighted second error value.

9. The method as claimed in claim 8, wherein the first error value and the second error value have a relation of a sigmoid function between them.

10. The method as claimed in claim 8, wherein the minimum error value is calculated by, $e_k = \alpha_k \cdot e_k^{CM} + \beta_k \cdot e_k^{DD}$, wherein $\alpha_k = g(|e_k^{DD}|)$, $$\beta_k = (1 - g(|e_k^{DD}|))\frac{|e_k^{CM}|}{|e_k^{DD}|}, \text{ and}$$

$$g(x) = \frac{1}{1 + e^{-a(x-0.5)}}, a > 0,$$

wherein $e_k$ represents the minimum error value, $e_k^{CM}$ represents the first error value obtained through the calculation using the first scheme, $e_k^{DD}$ represents the second error value obtained through the calculation using the second scheme, $\alpha_k$ represents the first weight, and $\beta_k$ represents the second weight.

11. The method as claimed in claim 7, wherein the first scheme is a CM (constant modulus) scheme and the second scheme is a decision-directed (DD) scheme.

12. The method as claimed in claim 7, wherein the received signal is generated by despreading a spread-spectrum modulated signal.

13. The method as claimed in claim 7, wherein each of the error values includes a mean square error value.

14. A system for transmitting and receiving a signal in a wireless communication system using an adaptive antenna array scheme, the system comprising:
a despreader for generating a despread signal by despreading a received signal;
a signal processor for obtaining a minimum error value by individually providing weights to a first scheme and a second scheme for minimizing an error of the received signal, producing a reception weight for creating a reception beam by a receiver through a calculation using the despread signal and the minimum error value, and producing a transmission weight for creating a transmission beam by a counterpart transmitter through a calculation using the reception weight and the minimum error value;
a feedback information generator for generating feedback information including the transmission weight; and
a transmitter for transmitting the feedback information to a counterpart receiver;
wherein the minimum error value is obtained by providing a first weight to a first error value obtained through a calculation for achieving a minimum cost function by the first scheme, providing a second weight calculated from the first weight to a second error value obtained through a calculation for achieving a minimum cost function by the second scheme, and then calculating the minimum error value from the weighted first error value and the weighted second error value.

15. The system as claimed in claim 14, wherein the signal processor comprises:
an error value combiner for receiving the despread signal and obtaining the minimum error value by individually providing weights to the first scheme and the second scheme for minimizing the error of the received signal;
a weight calculator for producing the reception weight for creating the reception beam by the receiver through a calculation using the despread signal and the minimum error value, and producing the transmission weight for creating the transmission beam by the counterpart transmitter through a calculation using the reception weight and the minimum error value; and
a memory for storing the transmission weight calculated by the weight calculator during a time interval and then outputting the transmission weight to the weight calculator, thereby applying the transmission weight stored in each time interval to calculation for a transmission weight of a next time interval.

16. The system as claimed in claim 15, wherein the first error value and the second error value have a relation of a sigmoid function between them.

17. The system as claimed in claim 15, wherein the minimum error value is calculated by, $$e_k = \alpha_k \cdot e_k^{CM} + \beta_k \cdot e_k^{DD}, \text{ wherein}$$

$$\alpha_k = g(|e_k^{DD}|),$$

$$\beta_k = (1 - g(|e_k^{DD}|)) \frac{|e_k^{CM}|}{|e_k^{DD}|}, \text{ and}$$

$$g(x) = \frac{1}{1 + e^{-a(x-0.5)}}, a > 0,$$

wherein $e_k$ represents the minimum error value, $e_k^{CM}$ represents the first error value obtained through the calculation using the first scheme, $e_k^{DD}$ represents the second error value obtained through the calculation using the second scheme, $\alpha_k$ represents the first weight, and $\beta_k$ represents the second weight.

18. The system as claimed in claim 14, wherein the first scheme is a GM (constant modulus) scheme and the second scheme is a decision-directed (DD) scheme.

19. The system as claimed in claim 14, wherein each of the error values includes a mean square error value.

20. A system for transmitting and receiving transmission weight information in a wireless communication system using an adaptive antenna array scheme, the system comprising:
a first apparatus including a first receiver and a first transmitter; and
a second apparatus including a second receiver and the second transmitter,
wherein the first receiver receives a signal, generates a despread signal by despreading the received signal,
wherein the first apparatus obtains a minimum error value by individually providing weights to a first scheme and a second scheme for minimizing an error of the received signal, produces a reception weight for creating a reception beam by the first receiver through a calculation using the despread signal and the minimum error value, produces a transmission weight for creating a transmission beam by a second transmitter of a second apparatus through calculation using the reception weight and the minimum error value, and generates feedback information including the transmission weight,
wherein the first transmitter transmits the feedback information to the second apparatus,
wherein the second receiver receives the feedback information,
wherein the second apparatus obtains the transmission weight from the feedback information and generates the transmission beam correspondingly to the transmission weight, and
wherein the second transmitter transmits a signal of the transmission beam through the second transmitter to the first apparatus.

21. The system as claimed in claim 20, wherein the first apparatus comprises:
a signal processor for obtaining the minimum error value by individually providing weights to the first scheme and the second scheme for minimizing the error of the received signal, producing the reception weight for creating the reception beam by the first receiver through a calculation using the despread signal and the minimum error value, and producing the transmission weight for creating the transmission beam by the second transmitter through a calculation using the reception weight and the minimum error value;
a feedback information generator for generating feedback information including the transmission weight; and
a transmitter for transmitting the feedback information to the second receiver.

22. The system as claimed in claim 21, wherein the signal processor comprises:
an error value combiner for receiving the despread signal and obtaining the minimum error value by individually providing weights to the first scheme and the second scheme for minimizing the error of the received signal;
a weight calculator for producing the reception weight for creating the reception beam by the receiver through a calculation using the despread signal and the minimum error value, and producing the transmission weight for creating the transmission beam by the second transmitter through a calculation using the reception weight and the minimum error value; and
a memory for storing the transmission weight calculated by the weight calculator during a time interval and then outputting the transmission weight to the weight calculator, thereby applying the transmission weight stored in each time interval to calculate for a transmission weight of a next time interval.

23. The system as claimed in claim 21, wherein the minimum error value is obtained by providing a first weight to a first error value obtained through a calculation for achieving a minimum cost function by the first scheme, providing a second weight calculated from the first weight to a second error value obtained through a calculation for achieving a minimum cost function by the second scheme, and calculating the minimum error value from the weighted first error value and the weighted second error value.

24. The system as claimed in claim 21, wherein the first error value and the second error value have a relation of a sigmoid function between them.

25. The system as claimed in claim 21, wherein the minimum error value is calculated by, $e_k = \alpha_k \cdot e_k^{CM} + \beta_k \cdot e_k^{DD}$, wherein $\alpha_k = g(|e_k^{DD}|)$, $\beta_k = (1 - g(|e_k^{DD}|)) \frac{|e_k^{CM}|}{|e_k^{DD}|}$, and $g(x) = \frac{1}{1 + e^{-a(x-0.5)}}$, $a > 0$, wherein $e_k$ represents the minimum error value, $e_k^{CM}$ represents the first error value obtained through the calculation using the first scheme, $e_k^{DD}$ represents the second error value obtained through the calculation using the second scheme, $\alpha_k$ represents the first weight, and $\beta_k$ represents the second weight.

26. The system as claimed in claim 20, wherein the first scheme is a CM (constant modulus) scheme and the second scheme is a decision-directed (DD) scheme.

27. The system as claimed in claim 20, wherein each of the error values includes a mean square error value.

28. The system as claimed in claim 20, wherein the second transmitter comprises:
 a feedback information processor for obtaining the transmission weight from the feedback information; and
 a transmission beam generator for generating the transmission beam by means of the transmission weight.

* * * * *